(12) United States Patent
Li et al.

(10) Patent No.: US 9,399,712 B2
(45) Date of Patent: Jul. 26, 2016

(54) VINYLBENZYL-ETHERIFIED-DOPO COMPOUND RESIN COMPOSITION AND PREPARATION AND APPLICATION THEREOF

(71) Applicant: ELITE ELECTRONIC MATERIAL (ZHONG SHAN) CO., LTD., Zhongshan, Guangdong Province (CN)

(72) Inventors: Changyuan Li, Zhongshan (CN); Chen-Yu Hsieh, Taiwan (CN); Yalu Wang, Zhongshan (CN); Zongyan Zhao, Zhongshan (CN); Zhilong Hu, Zhongshan (CN)

(73) Assignee: Elite Electronic Material (Zhong Shan) Co., LTD., Zhongshan (CN)

( * ) Notice: Subject to any disclaimer, the term of this patent is extended or adjusted under 35 U.S.C. 154(b) by 0 days.

(21) Appl. No.: 14/520,779

(22) Filed: Oct. 22, 2014

(65) Prior Publication Data

US 2015/0166788 A1    Jun. 18, 2015

(30) Foreign Application Priority Data

Dec. 17, 2013  (CN) .......................... 2013 1 0699895

(51) Int. Cl.
*C08L 71/00* (2006.01)
*C08L 71/12* (2006.01)

(52) U.S. Cl.
CPC ............... *C08L 71/00* (2013.01); *C08L 71/126* (2013.01)

(58) Field of Classification Search
CPC ............................... C08L 71/00; C08L 71/126

USPC .......................................... 525/152; 524/508
See application file for complete search history.

(56) References Cited

U.S. PATENT DOCUMENTS

| 5,994,429 | A  | 11/1999 | Honda et al. |
| 6,440,567 | B1 | 8/2002  | Choate et al. |

FOREIGN PATENT DOCUMENTS

| JP | 2009126998 A | * | 6/2009 |
| TW |      322507 B |   | 12/1997 |
| TW |      I238846 B |   | 9/2005 |

* cited by examiner

*Primary Examiner* — Kelechi Egwim
(74) *Attorney, Agent, or Firm* — Oliff PLC

(57) ABSTRACT

The present invention belongs to the technical field of a resin having low dielectric properties, and presents a vinylbenzyl-etherified-DOPO compound resin composition and a preparation method and application thereof. The composition includes a vinylbenzyl-etherified-DOPO compound resin and a vinyl-terminated polyphenylene ether resin. The DOPO resin is vinylbenzyl etherified in the present invention, thus obtaining a vinylbenzyl-etherified-DOPO compound resin having low dielectric properties, and there are no hydroxyl group on itself, no hydroxyl function group will be generated during the cross-linking reaction; and the vinylbenzyl-etherified-DOPO compound resin contains phosphorus atoms, and has flame retardancy. The prepared vinylbenzyl-etherified-DOPO compound resin and the hydroxyl-free, low dielectric vinyl-terminated polyphenylene ether resin are combined in the present invention, thus obtaining a resin composition having low dielectric constant and low dielectric loss tangent, which can achieve excellent dielectric properties and flame retardancy when applying to the metal laminates and printed circuit boards.

18 Claims, 2 Drawing Sheets

VINYLBENZYL-ETHERIFIED-DOPO COMPOUND RESIN COMPOSITION AND PREPARATION AND APPLICATION THEREOF

FIELD OF THE INVENTION

The present invention belongs to the technical field of resins having low dielectric properties, particularly relates to a vinylbenzyl-etherified-DOPO compound resin composition having low dielectric properties (Dk/Df) and high flame retardancy and the preparation method and application thereof.

BACKGROUND OF THE INVENTION

The new era of electronic products trend to light-weight, slim, and compact size, and are suitable for high-frequency transmission, therefore, the wiring for the circuit boards has developed towards higher density, and the selection for the circuit board materials has developed towards more stringent requirements. As the high frequency electronic components are engaged with the circuit boards, in order to maintain the transmission rate and keep the integrity of the transmission signals, the laminate materials for the circuit boards should have low dielectric constant (Dk) and dielectric loss tangent (also called dissipation factor, DO. At the same time, in order to maintain the normal operation function of the electronic components in a high-temperature and high-humidity environment, the circuit boards also should have the properties such as heat resistance, flame retardancy and low water absorption. Due to the excellent adhesion, heat resistance, and formability, the epoxy resins are widely applied in the electronic parts and components as well as the copper foil-coated laminate or sealing material of the electrical machinery. With respect to the safety for preventing from fire, the materials are required to have flame retardancy, generally the flame retardancy can be achieved by the epoxy resins having flame retardancy in combination with the additional flame retardants, for example, the epoxy resins are provided with flame retardancy by incorporating halogen, especially bromine therein, thus improving the reactivity of the epoxy groups. However, after a long-time use at a high temperature, the halides may occur dissociation, thus resulting in the risk of corrosion of the fine wires. Furthermore, after burning, the used waste electronic parts and components will generate the hazardous compounds such as halide and the like, and pollute the environment. In order to substitute for the abovementioned halide flame retardants, some studies apply phosphorus-containing compounds as flame retardants, for example adding phosphate ester (Taiwan Patent No. 1238846) or phosphorus red (Taiwan Patent No. 322507) into the epoxy resin composition. However, the phosphate ester will occur hydrolysis reaction to disassociate an acid from it, thus influencing its migration resistance; and although the phosphorus red has high flame retardancy, it is specified as a hazardous substance in the fire control law, as it can generate a minute amount of phosphine gas under a high temperature and humid environment.

At present, the environment-friendly halogen-free resin compositions, in order to achieve the flame retardancy of UL94 V-0, are generally added with phosphorus-containing flame retardants, wherein the DOPO compounds are preferred. However, the conventional DOPO compounds, as they have P—H bonds in their structures and have high activities with alkenes, epoxy bonds, and carbonyls, can react and form various derivatives. DOPO and its derivatives, as the molecular structures contain biphenyl ring and phenanthrene ring structures, particularly the side phosphorus groups are introduced in circular O=P—O bond, have higher thermal stability and chemical stability, and better flame retardancy as compared with the general acyclic organophosphate. DOPO and its derivatives can be used as reaction type and addition type flame retardants, the synthetized flame retardants have no halogen, no smoke, no toxicity, no migration, and long-lasting flame retardant property. As the DOPO compounds containing hydroxyls (such as DOPO-HQ from Nu Tech Fine Chemical Co. Ltd.), due to their hydroxyls, can react and bond with other resins, and the presence of hydroxyls will in turn result in adverse effects on the dielectric constant and dielectric loss tangent (the excessive high Dk and Df values), the DOPO compounds containing hydroxyls are not suitable to be added in the low dielectric resin composition.

With respect to the electrical properties of the copper foil-coated laminates and printed circuit boards, those to be mainly contemplated comprise dielectric constant and dielectric loss tangent of the material. In general, as the signal transmission speed of the laminate is inversely proportional to the square root of the dielectric constant of the laminate material, the lower dielectric constant of the laminate material is generally better; on the other hand, as the lower dielectric loss tangent represents the lower signal transmission loss, the material having lower dielectric loss tangent can provide better transmission quality.

Therefore, how to develop a material still having low dielectric constant and low dielectric loss tangent which are measured at 10 GHz, and apply it in manufacturing a high frequency printed circuit board, are the problems to be solved by the printed circuit board material supplies at present.

SUMMARY OF THE INVENTION

In order to overcome the above defects and deficiencies in the prior art, the primary purpose of the present invention is to provide a vinylbenzyl-etherified-DOPO compound resin composition. Such composition has low dielectric properties (Dk/Df), and good flame retardancy.

Another purpose of the present invention is to provide a prepreg prepared by the above vinylbenzyl-etherified-DOPO compound resin composition.

A still another purpose of the present invention is to provide a use of the above prepreg in the laminates and the printed circuit boards. As the vinylbenzyl-etherified-DOPO compound resin composition of the present invention contains specific components and proportion, and when the prepreg prepared therefrom is used to manufacture the circuit boards, the circuit boards can achieve good properties, such as high glass transition temperature, low dielectric properties, high heat resistance, etc., thus achieving the purpose for applying to the laminates and printed circuit boards.

The purposes of the present invention can be achieved by the following solutions:

A vinylbenzyl-etherified-DOPO compound resin composition, comprising the components of (A) vinylbenzyl-etherified-DOPO compound resin; and (B) vinyl-terminated polyphenylene ether resin.

Preferably, the vinylbenzyl-etherified-DOPO compound resin composition comprises 10~500 parts by weight of vinylbenzyl-etherified-DOPO compound resin and 100 parts by weight of vinyl-terminated polyphenylene ether resin.

In the vinylbenzyl-etherified-DOPO compound resin composition described in the present invention, more preferably on the basis of 100 parts by weight of (B) vinyl-terminated polyphenylene ether resin, the (A) vinylbenzyl-etherified-DOPO compound rein is 30-500 parts by weight, most preferably 30-80 parts by weight.

The most preferred content of the vinylbenzyl-etherified-DOPO compound resin is 30~80 parts by weight, if the content is lower than 30 parts by weight, the flame retardancy is poor; if the content is higher than 80 parts by weight, the dielectric properties (Dk and Df) are deteriorated, as the excessive vinylbenzyl-etherified-DOPO compound resin results in the increase of phosphorus content, and when the usage amount is higher than 500 parts by weight, the original low dielectric properties will be lost.

The vinylbenzyl-etherified-DOPO compound resin is any compound having the structures shown in formula (I) to (III), and at least one of the modified resins and modified substances having such structures:

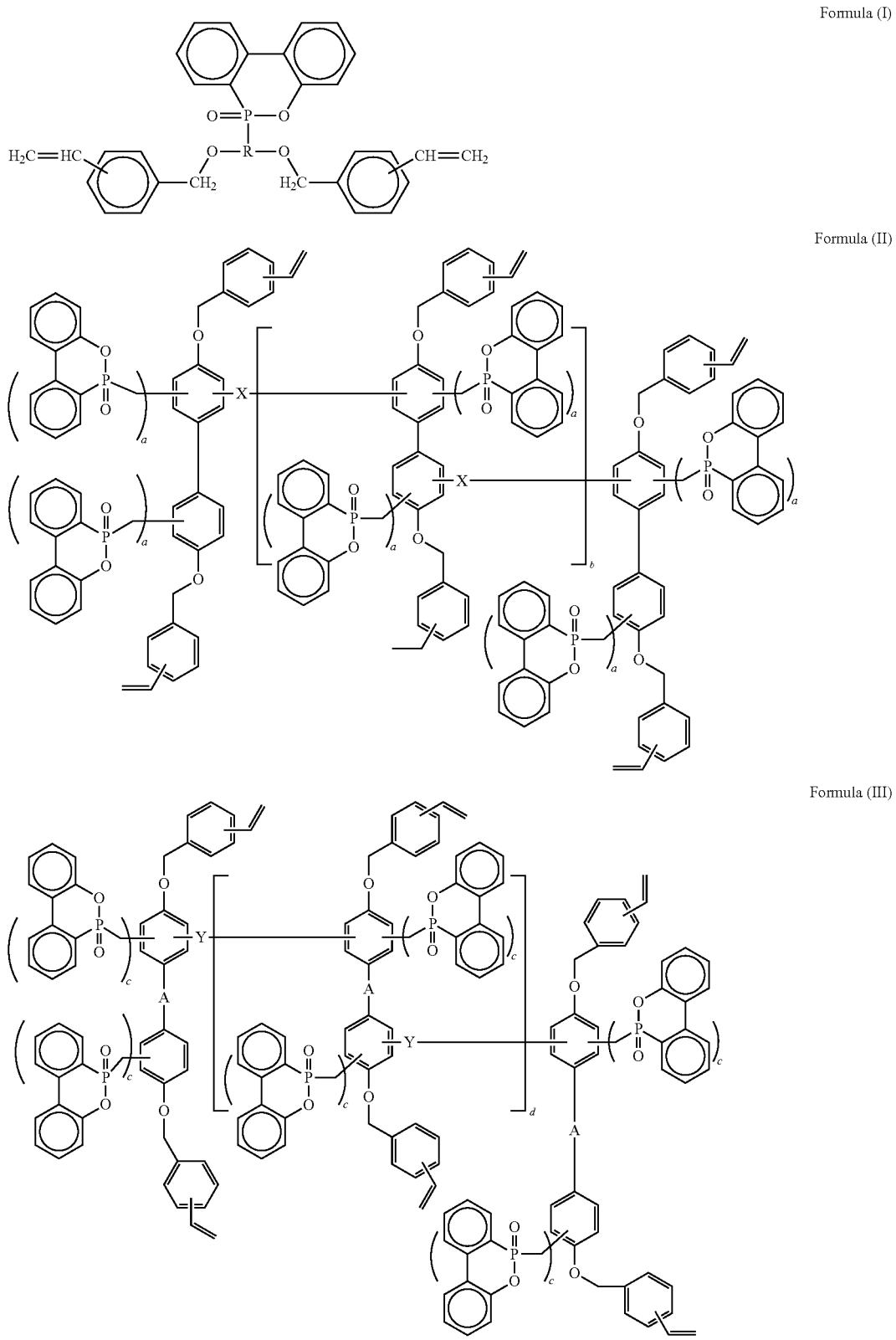

wherein, R is 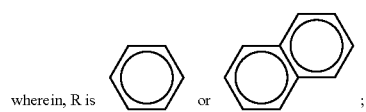 ;

X, Y are —CH$_2$— or —CH$_2$—O—CH$_2$—, respectively;

A represents C1~20 linear, branched or circular alkyl; preferably —CH$_2$— or —C(CH$_3$)$_2$—;

a is any natural number of 0~4, and at least one of a is not 0;

c is any natural number of 0~4, and at least one of c is not 0;

b, d are natural number of 0~6;

preferably, the vinylbenzyl-etherified-DOPO compound resin is a vinylbenzyl-etherified-DOPO compound resin having the structure shown by any one of the above formula (II) and the following formula (IV)~(XII):

Formula (IV)

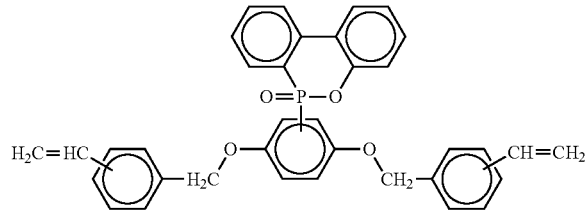

Formula (V)

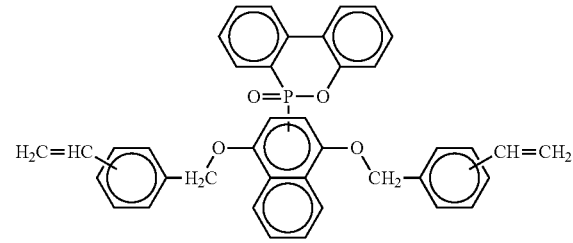

Formula (VI)

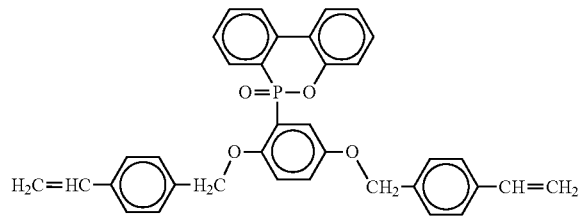

Formula (VII)

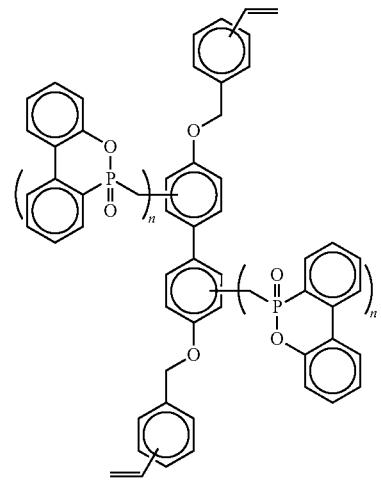

Formula (VIII)
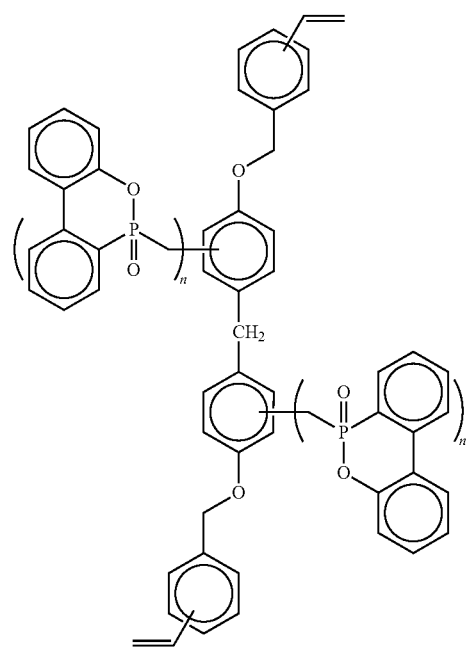
Formula (IX)
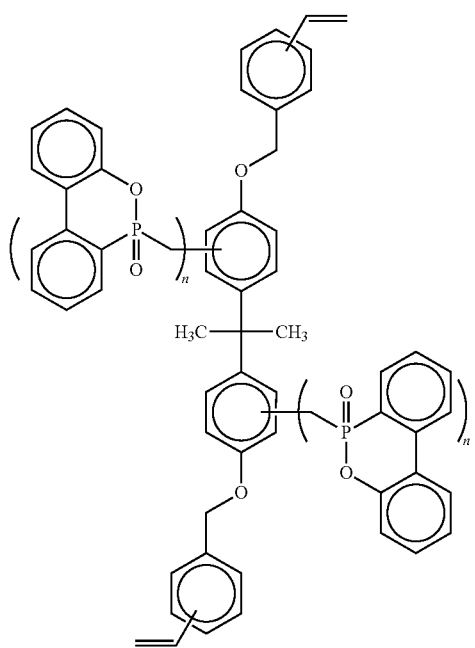
Formula (X)
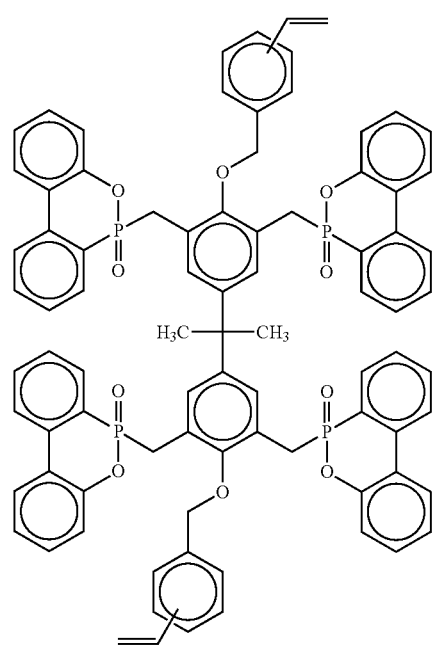

-continued

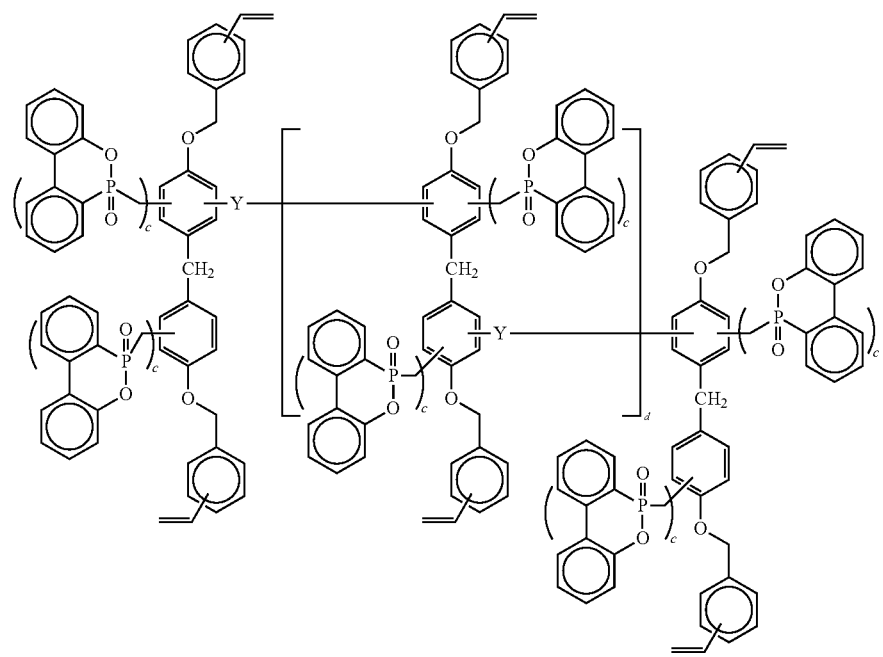

Formula (XI)

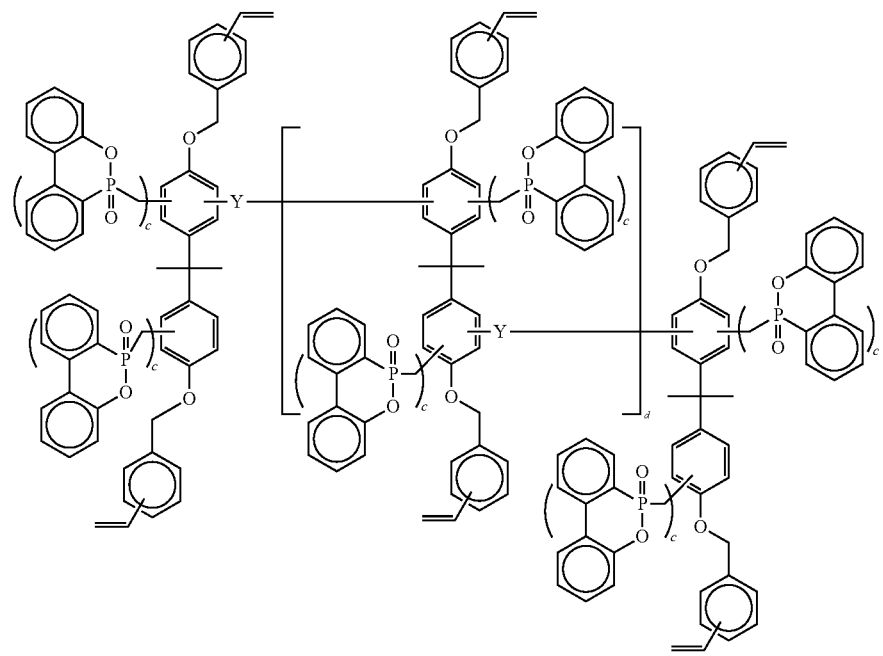

Formula (XII)

X, Y are —CH$_2$— or —CH$_2$—O—CH$_2$—, respectively;
n is any natural number of 1~4;
a is any natural number of 0~4, and at least one of a is not 0;
c is any natural number of 0~4, and at least one of c is not 0;
b, d are any natural number of 0~6.

The vinylbenzyl-etherified-DOPO compound resin is prepared by the reaction of the DOPO compound containing hydroxyl and styrene-based compound.

The DOPO compound containing hydroxyl has the chemical structure shown by any one of the following formula (XIII)~(XV):

Formula (XIII)
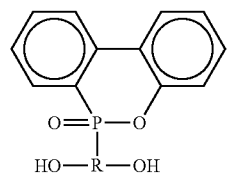
Formula (XIV)
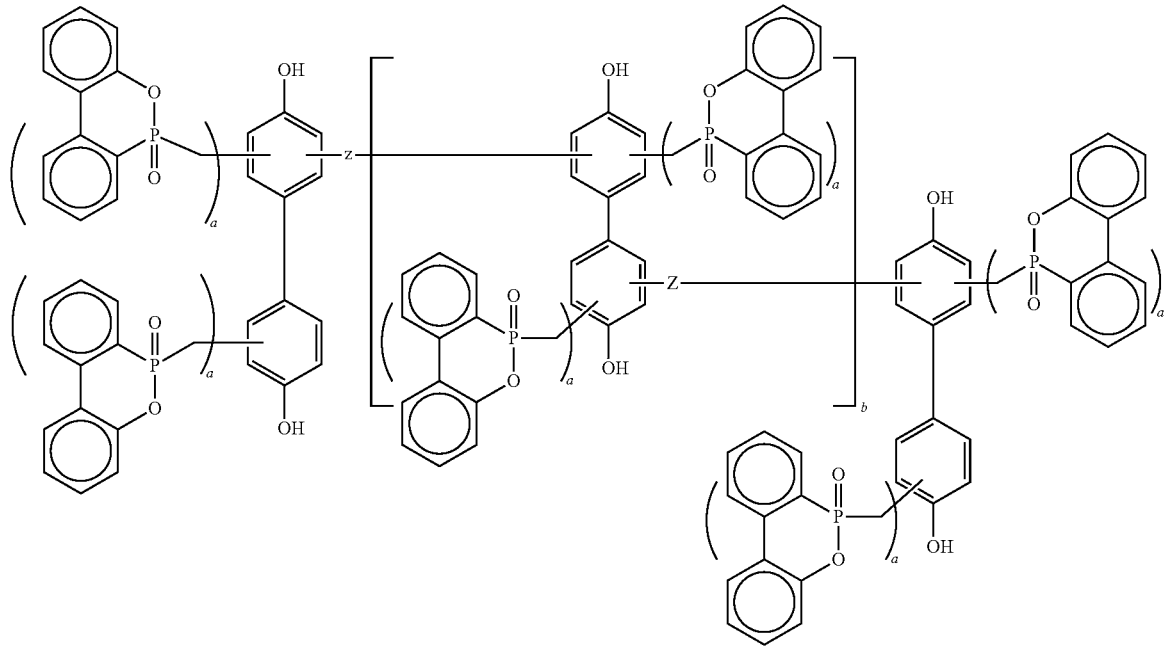
Formula (XV)
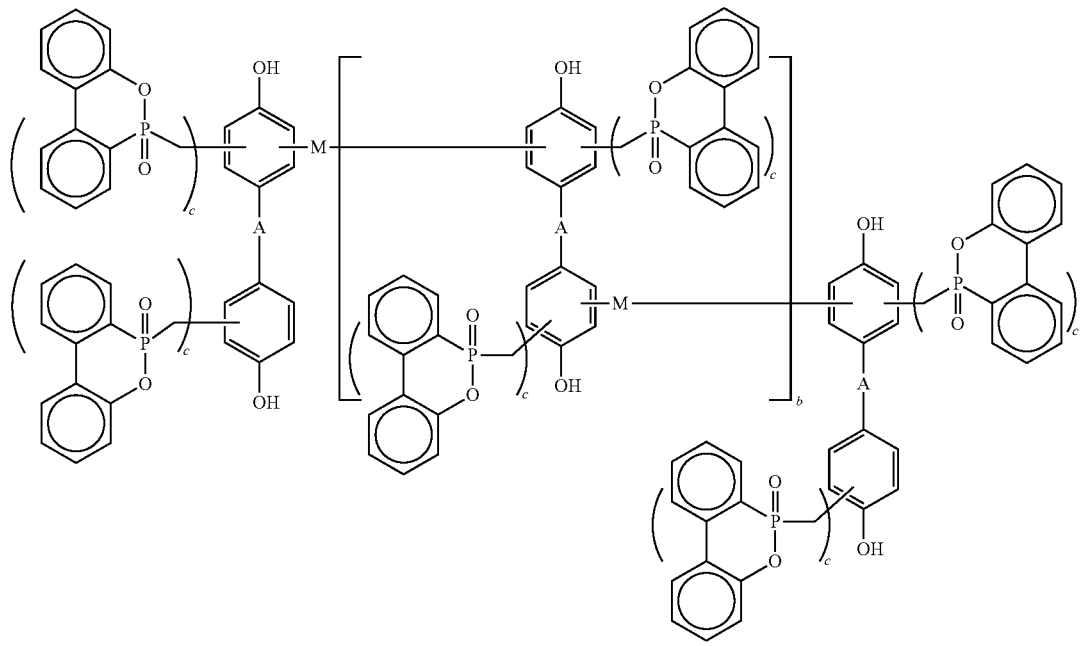
wherein, R is  or 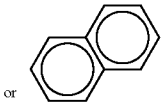 ;

Z, M are —CH₂— or —CH₂—O—CH₂—, respectively;

a is any natural number of 0~4, and at least one of a is not 0;

c is any natural number of 0~4, and at least one of c is not 0;

b, d are any natural number of 0~6;

A represents C1~20 linear, branched or circular alkyl; preferably —CH₂— or —C(CH₃)₂—.

Preferably, the DOPO compound containing hydroxyl refers to the DOPO compound containing hydroxyl having the structure shown by any one of formula (XIV) and the following formula (XVI)~(XXIII):

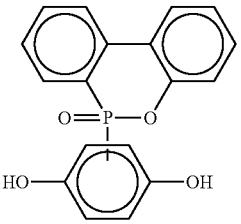

Formula (XVI)

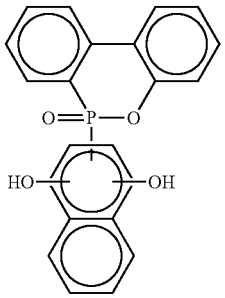

Formula (XVII)

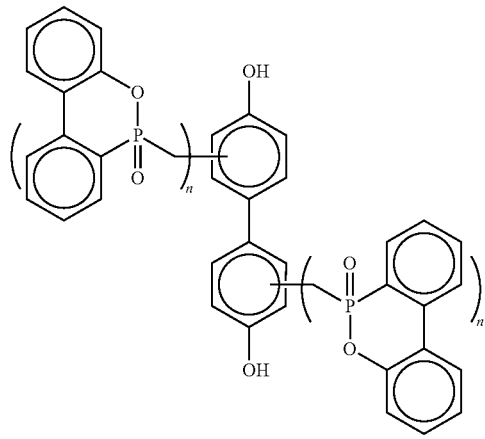

Formula (XVIII)

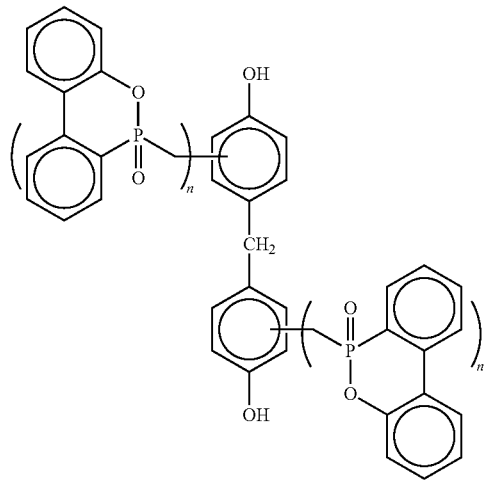

Formula (XIX)

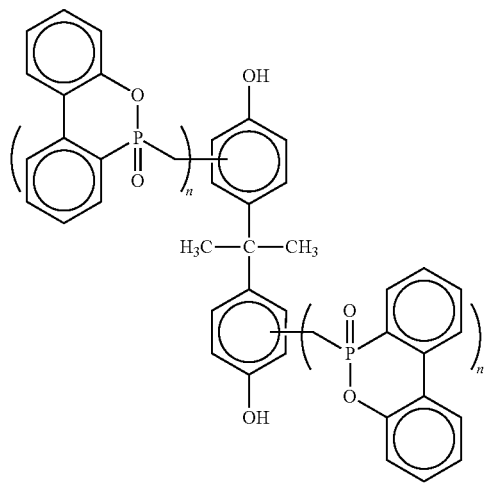

Formula (XX)

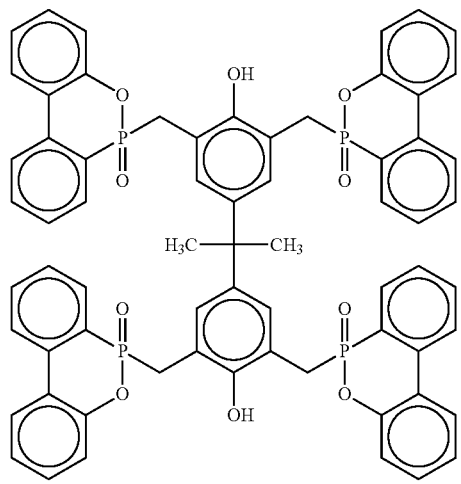

Formula (XXI)

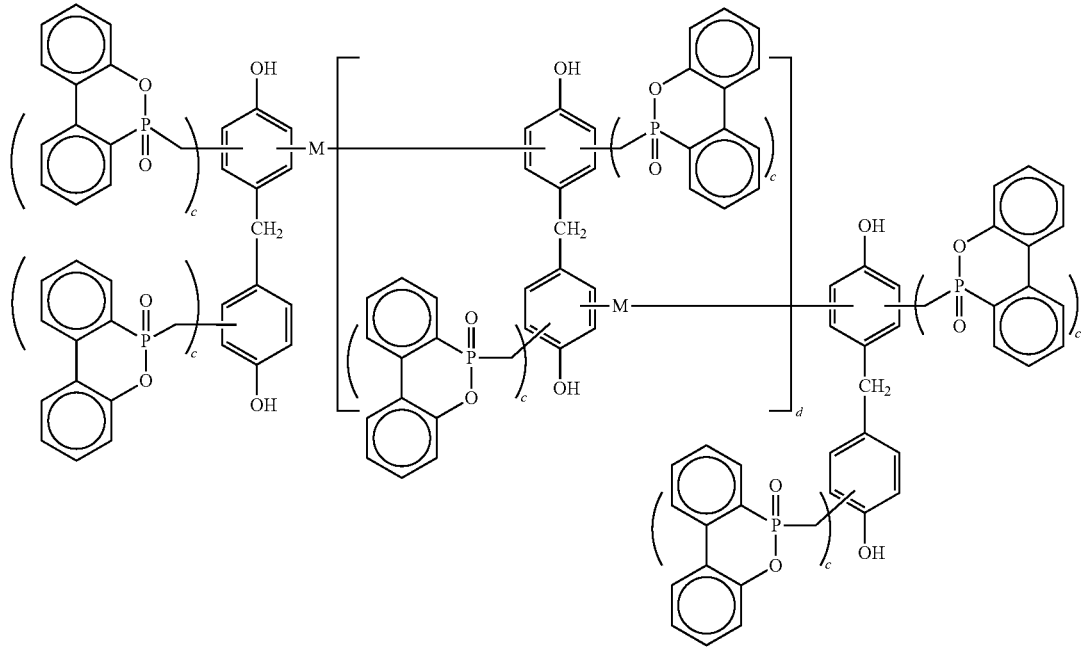

Formula (XXII)

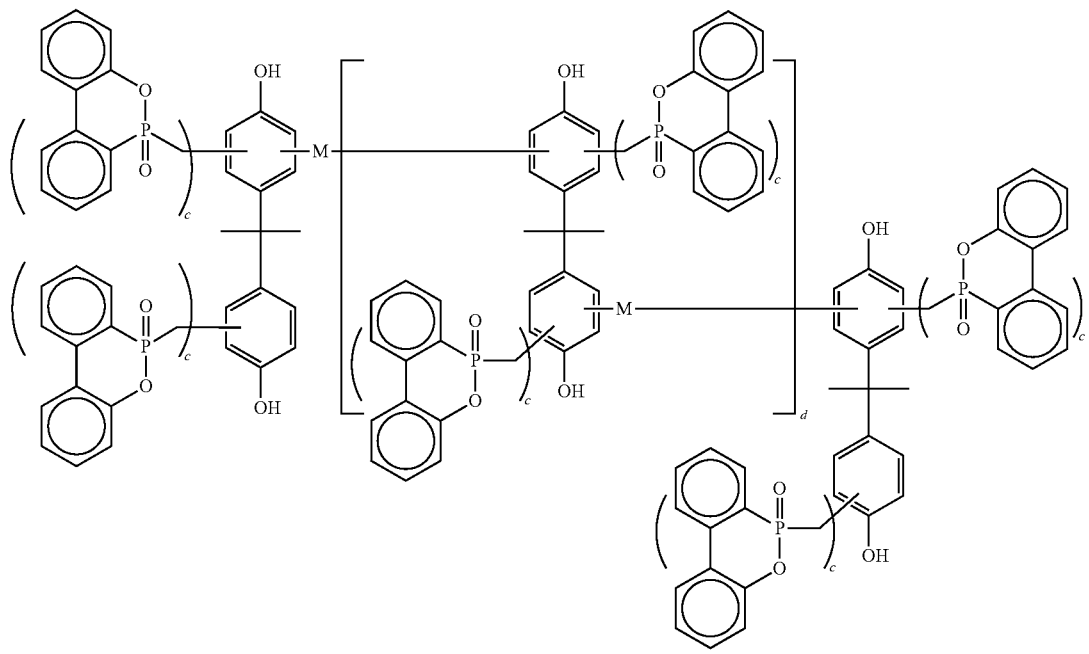

Formula (XXIII)

Z, M are —CH$_2$— or —CH$_2$—O—CH$_2$—, respectively;

n is any natural number of 1~4;

a is any natural number of 0~4, and at least one of a is not 0;

c is any natural number of 0~4, and at least one of c is not 0;

b, d are any natural number of 0~6.

In the preparation method of the vinylbenzyl-etherified-DOPO compound resin, the styrene-based compound can be selected from at least one of 4-chloro-methyl styrene, 3-chloro-methyl styrene, and 2-chloro-methyl styrene.

Preferably, the vinylbenzyl-etherified-DOPO compound can be prepared by the reaction of the DOPO compound containing hydroxyl and the styrene-based compound in toluene solvent, at the presence of hydroxide and tetrabutyl ammonium halide.

The specific reaction conditions are:

reaction temperature: 50~70° C.;

reaction time: 6~10 hr;

the molar ratio of the DOPO compound containing hydroxyl, styrene-based compound, hydroxide, and tetrabutyl ammonium halide is 1:(2.3~3):(2.2~3): (0.15~0.2).

The hydroxide is preferably at least one of sodium hydroxide and potassium hydroxide.

The tetrabutyl ammonium halide is preferably at least one of tetrabutyl ammonium bromide and tetrabutyl ammonium iodide.

More preferably, the product is washed by methanol after the reaction to remove the reaction byproduct and impurity.

polyphenylene ether resin wherein the end capping group has an unsaturated double bond.

Preferably, the vinyl-terminated polyphenylene ether resin refers to a polyphenylene ether resin having one of the structures of the following formula (XXIV) and formula (XXV), but not limited to thereto:

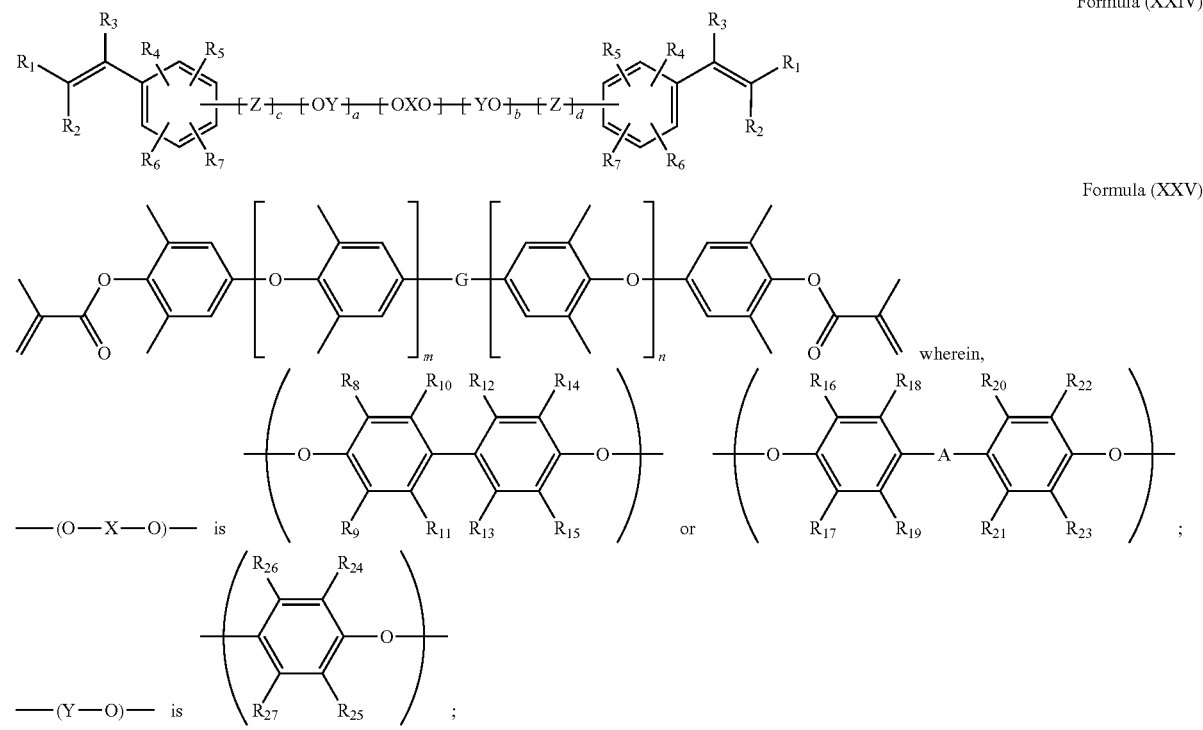

Formula (XXIV)

Formula (XXV)

The removal of the byproduct and impurity refers to the generation of sodium halide (sodium chloride) after the reaction of the halogen-containing substance in the reactant, vinylbenzyl-etherified-DOPO compound resin of the present invention is changed into a brown clear liquid resin by washing.

As compared with the general DOPO compound resin containing hydroxyl, the vinylbenzyl-etherified-DOPO compound resin in the vinylbenzyl-etherified-DOPO compound resin composition of the present invention has the advantages of: (1) it has vinyl functional group, and can react with other compound containing vinyl functional group; (2) as the vinyl-benzyl etherification modification, the hydroxyl groups in the original structure are reduced, thus the resulting vinylbenzyl-etherified-DOPO compound resin has better resin dielectric properties as compared with the DOPO-HQ resin containing hydroxyl; (3) as compared with the general DOPO-HQ resin containing hydroxyl, when the vinylbenzyl-etherified-DOPO compound resin is added to the resin composition, the resin which is added with the vinylbenzyl-etherified-DOPO compound, the laminate has a low dielectric constant (4) the vinylbenzyl-etherified-DOPO compound resin contains phosphorus atom, thus obtaining good flame retardancy.

In the components of the vinylbenzyl-etherified-DOPO compound resin composition of the present invention, the vinyl-terminated polyphenylene ether resin refers to a $R_1$, $R_2$ are hydrogen atom, $R_3$, $R_4$, $R_5$, $R_6$ and $R_7$ are the same or different, and are hydrogen atom, halogen atom, alkyl group or halogen-substituted alkyl group;

$R_8$, $R_9$, $R_{10}$, $R_{13}$, $R_{14}$ and $R_{15}$ are the same or different, and are halogen atom, C1~6 alkyl group or phenyl; $R_{11}$ and $R_{12}$ are the same or different, and are hydrogen atom, halogen atom, C1~6 alkyl group, or phenyl;

$R_{16}$, $R_{17}$, $R_{18}$, $R_{19}$, $R_{20}$, $R_{21}$, $R_{22}$ and $R_{23}$ are the same or different, and are halogen atom, C1~6 alkyl group, phenyl, or hydrogen atom; A is C1~20 linear, branched, or circular alkyl; preferably —$CH_2$— or —$C(CH_3)_2$—;

$R_{24}$ and $R_{25}$ are the same or different, and are halogen atom, C1~6 alkyl group or phenyl; $R_{26}$ and $R_{27}$ are the same or different, and are hydrogen atom, halogen atom, C1~6 alkyl group or phenyl;

Z represents an organic group containing at least one carbon atom, such group can contain oxygen atom, nitrogen atom, sulfur atom, and/or halogen atom, for example Z can be methylene (—$CH_2$—);

a and b are natural number of 1~30, respectively, c and d are 1;

wherein, G is biphenol A, biphenol F or covalent bond; m and n are natural number of 1~15, respectively.

Preferably, the vinyl-terminated polyphenylene ether resin described in the present invention refers to at least one of methacrylate polyphenylene ether resin and vinylbenzyl ether-terminated polyphenylene ether resin.

More preferably, the vinyl-terminated polyphenylene ether resin refers to at least one of SA-9000 purchased by Sabic and OPE-2st purchased by Mitsubishi Gas Chemical Company.

The vinylbenzyl ether-terminated polyphenylene ether resin refers to the polyphenylene ether resin containing the structure of

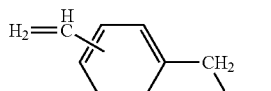

As compared to polyphenylene ether resin having bifunctional terminal hydroxyl, the vinyl-terminated polyphenylene ether resin described in the present invention has lower dielectric properties, ie., having low dielectric constant and dielectric loss tangent.

The vinylbenzyl-etherified-DOPO compound resin composition of the present invention can further comprise component (C) polymer, wherein on the basis of 100 parts by weight of (B) vinyl-terminated polyphenylene ether resin, the addition proportion of component (C) is 5 to 100 parts by weight, preferably 10 to 50 parts by weight, and can further degrade the dielectric properties of the laminate, and there are no specific limits on it, the well-known styrene-butadiene copolymer are all available, such as at least one of styrene-butadiene copolymer, polybutadiene homopolymer, hydrogenated diene-butadiene-styrene polymer, maleinized diene-butadiene-styrene copolymer, styrene-butadiene-styrene copolymer, styrene-isoprene-styrene copolymer, styrene-butadiene-divinylbenzene copolymer and maleinized styrene-butadiene copolymer.

The vinylbenzyl-etherified-DOPO compound resin composition of the present invention, in order to improve the laminate properties, can further be added with at least one selected from the group consisted of the following substances or other modifiers: cyanate resin, maleimide resin, polyester resin, triallyl isocyanurate (TAIC), isocyanate resin, styrene resin, polyamide resin, polyimide resin, triallyl cyanurate (TAC).

The vinylbenzyl-etherified-DOPO compound resin composition of the present invention, in order to achieve better performance, can be added with cyanate resin and maleimide resin, which, in addition to improving the cross-linking property, can further increase the glass transition temperature, heat resistance and the adhesion with the copper foil.

There are no specific limits on the cyanate resin, the well-known cyanate resins are all available, such as the compounds having the structure of Ar—O—C≡N, wherein Ar is substituted or unsubstituted phenyl, biphenyl, naphthalene, phenolic, bisphenol A, bisphenol A phenolic, bisphenol F, bisphenol F phenolic or phenolphthalein. Moreover, the above Ar can be further bonded to the substituted or unsubstituted dicyclopentadienyl (DCPD).

Preferably, the cyanate resin is selected from a combination consisted of the following structures:

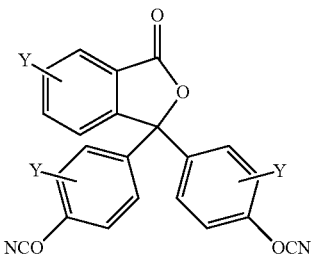

Formula (XXVI)

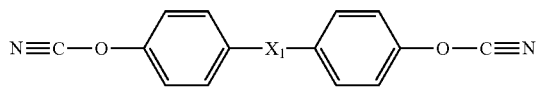

Formula (XXVII)

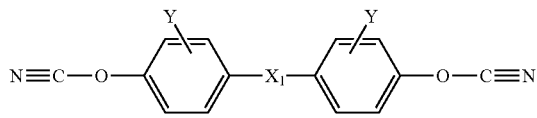

Formula (XXVIII)

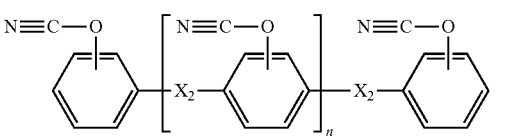

Formula (XXIX)

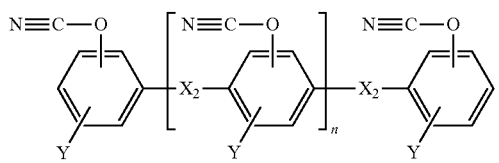

Formula (XXX)

Wherein each of $X_1$, $X_2$ is independently at least one of R, Ar, $SO_2$ or O; R is at least one of —C(CH$_3$)$_2$—, —CH(CH$_3$)—, —CH$_2$— and the dicyclopentadienyl-containing group; Ar is at least one of phenyl, biphenyl, naphthalene, phenolic, bisphenol A, hydrogenated bisphenol A, bisphenol A phenolic, bisphenol F and bisphenol F phenolic functional groups; n is an integer of 1~10; Y is an aliphatic functional group or aromatic functional group.

The aliphatic functional group refers to at least one of C1~30 alkyls, alkenyls, alkynyls, cycloalkyls, cycloalkenyls, and derivatives thereof. The aromatic functional group refers to C6~14 benzene ring-containing compound, such as at least one of benzene, naphthalene, anthracene, and derivatives thereof.

The cyanate resin is preferably, but not limited to, the following cyanate resins produced by Lonza Company, with the trade names of Primaset PT-15, PT-30S, PT-60S, CT-90, BADCY, BA-100-10T, BA-200, BA-230S, BA-3000S, BTP-2500, BTP-6020S, DT-4000, DT-7000, Methylcy, ME-240S, etc.

There are no specific limits on the maleimide resin, the well-known maleimide resins are all available, the maleimide resin is preferably at least one selected from the group consisting of 4,4'-bismaleimido diphenylmethane, phenylmethane maleimide oligomer, N,N'-meta-phenylenebismaleimide, bisphenol A diphenyl ether bismaleimide, 3,3'-dimethyl-5,5'-diethyl-4,4'-diphenylmethane bismaleimide, N,N'-(4-methyl-1,3-phenylene)bismaleimide and 1,6-bismaleimido-(2,2,4-trimethyl)hexane.

The vinylbenzyl-etherified-DOPO compound resin composition of the present invention can further comprise flame retardants, which make the laminate reach the flame retardant grade UL94V-0. There are no specific limits on the flame retardant, the flame retardants well known to those skilled in the art to which the present invention is pertained are all available. The flame retardant can use bromine-containing flame retardant, nitrogen-containing flame retardants, or phosphorus-containing flame retardant.

Preferably, the usage amount of the flame retardant is 10~60 parts by weight. The flame retardant can be, such as, but not limited to, bisphenol biphenyl phosphate, ammonium polyphosphate, hydroquinol-bis-(biphenyl phosphate), bisphenol A-bis-(biphenylphosphate), tri(2-carboxyethyl) phosphine (TCEP), tri(isopropyl chloro)phosphate, trimethyl phosphate (TMP), dimethyl methylphosphate (DMMP), resorcinol dixylyl phosphate (RDXP), phosphazene compound (such as the products SPB-100, SPH-100, and SPE-100 purchased from Otsuka Chemical Company or the products FP-110 and FP-300 purchased from Fushimi Pharmaceutical Company), meta-phenylene methylphosphonate (PMP), polyphosphate melamine (such as the product Melapur 200 purchased from BASF Company), melamine cyanurate, aluminum diethyl phosphate (such as OP-935 purchased from Clariant Company) and tri-hydroxyethyl isocyanurate, etc. Moreover, the flame retardant can also be 9,10-dihydro-9-oxa-10-phosphaphenanthrene-10-oxide (DOPO), DOPO-containing phenol resin (such as DOPO-HQ, DOPO-PN, and DOPO-BPN), DOPO-containing epoxy resin, DOPO-HQ-containing epoxy resin, etc. Among them, DOPO-BPN can be a bisphenol phenolic compound such as DOPO-BPAN, DOPO-BPFN, DOPO-BPSN, etc.

According to the examples of the present invention, the flame retardant applied in the resin composition of the present invention is at least one selected from the following flame retardants: tetrabromobisphenol A (abbreviated TBBA), ethyl-bis(tetrabromophenyl ortho-dicarboximide) (such as SAYTEX BT-93 purchased from Albemarle), and ethane-1,2-bis(pentabromobenzene) (such as SAYTEX 8010 purchased from Albemarle), resorcinol dixylylphosphate (RDXP, such as PX-200), phosphazene compound (phosphazene, such as the products SPB-100, SPH-100, and SPE-100 purchased from Otsuka Chemical Company or the products FP-110 and FP-300 purchased from Fushimi Pharmaceutical Company), Tri-m-tolylphosphine, and polyphosphate melamine (such as the product Melapur 200 purchased from BASF Company).

The vinylbenzyl-etherified-DOPO compound resin composition of the present invention can further be added with inorganic fillers. The main role for addition of inorganic fillers is to increase the heat conductivity of the resin composition, improve the properties such as thermal expansion, mechanical strength, etc., and preferably the inorganic fillers are homogeneously distributed in the resin composition.

Preferably, the usage amount of the inorganic filler is 70~150 parts by weight. The inorganic filler can comprise at least one of silicon dioxide (fused, non-fused, porous, hollow), aluminum oxide, aluminum hydroxide, magnesium oxide, magnesium hydroxide, calcium carbonate, aluminum nitride, boron nitride, silicon aluminum carbide, silicon carbide, sodium carbonate, titanium dioxide, zinc oxide, zirconium oxide, quartz, diamond powder, diamond-like powder, graphite, magnesium carbonate, potassium titanate, ceramic fiber, mica, boehmite, zinc molybdate, ammonium molybdate, zinc borate, calcium phosphate, calcinated talc, talc, silicon nitride, mullite, calcinated kaolin, clay, basic magnesium sulfate whisker, mullite whisker, barium sulfate, magnesium hydroxide whisker, magnesium oxide whisker, calcium oxide whisker, nanocarbon tube, nanoscale silicon dioxide and its related inorganic powder, and powder particles wherein the outer shells of the organic cores are modified by the insulators. And the inorganic filler can be in sphere, fiber, plate, granule, sheet, or needle whisker shapes, and can be selectively pretreated with silane coupling agents.

Moreover, the vinylbenzyl-etherified-DOPO compound resin composition of the present invention can selectively comprise at least one of the additives of hardening accelerator, interfacial active agent, silane coupling agent, toughening agent, solvent, etc. The main role for the addition of hardening accelerators is to increase the reaction rate of the resin composition. The main purpose for addition of interfacial active agent is to improve the homogenous dispersion of the inorganic fillers in the resin composition, and avoid the agglomeration of the inorganic fillers. The main purpose for addition of toughing agents is to improve the toughness of the resin composition. The main purpose for addition of solvents is to change the solid content of the resin composition, and adjust the viscosity of the resin composition.

Preferably, the usage amounts of the hardening accelerator, silane coupling agent, toughening agent, and solvent are 0.01~5 parts by weight, 0.001~0.1 parts by weight, 5~50 parts by weight, 50~300 parts by weight, respectively.

The hardening accelerator can comprise the catalysts, such as Lewis base or Lewis acid, and the like. Among them, the Lewis base can comprise at least one of imidazole, boron trifluoride amine complex, ethyl-triphenyl phosphonium chloride, 2-methyl imidazole, 2-phenyl imidazole, 2-ethyl-4-methyl imidazole, triphenylphosphine, and 4-dimethylaminopyridine. The Lewis acid can comprise metal salts compounds, such as at least one of manganese, ferrum, cobalt, nickel, copper, and zinc metal salts compounds, preferably the metal catalysts such as zinc octanoate or cobalt octanoate, and the like.

The hardening accelerator preferably comprises the peroxide hardening accelerator which can generate free radicals, such as comprising, but not limited to, at least one of dicumyl peroxide, tert-butyl peroxy benzoate and bis(tert-butyl peroxyisopropyl)benzene. Preferably, the hardening accelerator applied in the resin composition of the present invention is preferably 2,5-dimethyl-2,5-di(tert-butyl peroxy)-3-hexyne.

The silane coupling agent can comprise silane compound and siloxane compound.

Preferably, the silane coupling agent is at least one of amine-based silane compound, amine-based siloxane compound, epoxy-based silane compound and epoxy-based siloxane compound.

The toughening agent refers to at least one of rubber resin, polybutadiene acrylonitrile terminated with carboxyl, and core-shell polymer.

The solvent can comprise at least one of methanol, ethanol, ethylene glycol monomethyl ether, acetone, butanone (methyl ethyl ketone), methyl isobutyl ketone, cyclohexanone, toluene, xylene, methoxy ethyl acetate, ethoxy ethyl acetate, propoxy ethyl acetate, ethyl acetate, dimethylformamide, and propylene glycol methyl ether.

The abovementioned vinylbenzyl-etherified-DOPO compound resin composition can be applied to manufacture prepregs, laminates and printed circuit boards.

The vinylbenzyl-etherified-DOPO compound resin composition is dissolved in a solvent, prepared a resin varnish, adhered to the reinforcement material in a manner such as impregnation and the like, and formed a semi-cured state via a high temperature heating, thus obtaining a prepreg. Among them, the reinforcement material can be a fiber material, woven and non-woven fabrics, such as glass fiber cloth and the like, which can increase the mechanical strength of the prepreg. Moreover, the reinforcement material can be selectively pretreated by the silane coupling agent. The prepreg has the properties such as high glass transition temperature, low dielectric property, high heat resistance, etc.

The abovementioned prepreg can be cured and formed a prepreg or cured insulated layer via heating at high temperature or heating at high temperature and high pressure, wherein if the resin composition contains a solvent, the solvent can be removed via volatilization during the high temperature heating.

The abovementioned vinylbenzyl-etherified-DOPO compound resin composition varnish is coated on a PET film (polyester film), PI film (polyimide film), or coated on a copper foil (resin coated copper, RCC), then heated via baking, thus preparing a resin film. The resin film has the properties, such as high glass transition temperature, low dielectric property, high heat resistance, etc.

The abovementioned prepreg of the vinylbenzyl-etherified-DOPO compound resin composition and the metal foil are superimposed and compressed into a laminate (laminate), such as copper clad laminate (copper clad laminate), which has the properties such as high glass transition temperature, low dielectric properties, high heat resistance, etc., and is particularly applied in a high speed and high frequency signal transmission circuit board. The laminate comprises two or more metal foils and at least one insulated layer. Among them, the metal foil, such as copper foil, can further comprises at least one metal alloy of aluminum, nickel, platinum, silver, gold, etc., and the insulated layer is formed by solidifying the abovementioned prepreg or resin film at high temperature and high pressure, for example, the abovementioned prepreg is superimposed between two metal foils, and the insulated layer is formed by compressing at high temperature and high pressure.

The laminate of the present invention can be further processed via the processes such as making circuit and the like, and formed a printed circuit board, which, after engaged with the electronic components, can be operated under severe environments such as high temperature, high humidity, etc., and have no effects on its quality. The printed circuit board has the properties such as high glass transition temperature, low dielectric properties, high heat resistance, etc., and is applied in a high speed and high frequency signal transmission. Among them, the circuit board comprises at least one of the abovementioned laminates, and the circuit board can be made by the well-known processes.

The mechanism of the present invention is that:

in the present invention, the DOPO resin is vinylbenzylated, substituted for its hydroxyl group, thus obtaining a vinylbenzyl-etherified-DOPO compound resin having low dielectric properties, and there are no hydroxyl on itself, no hydroxyl functional group will be generated during the cross-linking reaction, therefore the laminate made by the resin composition of the present invention has better (lower) dielectric constant and dielectric loss tangent, and the vinylbenzyl-etherified-DOPO compound resin contains phosphorus element, and has flame retardancy; at the same time, in the present invention, the prepared vinylbenzyl-etherified-DOPO compound resin is hydroxyl-free, low dielectric vinyl-terminated polyphenylene ether resin is still hydroxyl-free during the crosslinking reaction, thus obtaining a resin composition having low dielectric constant and dielectric loss tangent, which can be applied in the metal laminates and printed circuit boards.

As compared to the prior art, the present invention has the advantages and beneficial effects of:

(1) both the vinylbenzyl-etherified-DOPO compound resin and the vinyl-terminated polyphenylene ether resin in the vinylbenzyl-etherified-DOPO compound resin composition of the present invention have low dielectric properties (Dk/Df), and there are no hydroxyl on themselves, no hydroxyl function group will be generated during the cross-linking reaction, therefore, the laminate made by the resin composition of the present invention has better (lower) dielectric constant and dielectric loss tangent, thus can be applied in the laminate having good dielectric properties in the circuit board industry.

(2) the component (A) vinylbenzyl-etherified-DOPO compound resin in the resin composition of the present invention contains phosphorus atom, which has flame retardant function. When the laminate formed after the resin composition of the present invention is hardened is burned, phosphorus element in the vinylbenzyl-etherified-DOPO compound resin can form a phosphorus-rich coke layer covered on the laminate surface, such coke layer is uninflammable, thermal insulation, and oxygen insulation. At the same time, due to the poor thermal conductivity of the coke layer, the heat transferred to the laminate is reduced, the thermal decomposition of the laminate is slowed, and air is prevented from entering continuously, in order to prevent from burning, thus obtaining the flame retardancy.

(3) without addition of other flame retardants, the resin composition of the present invention can achieve the V-0 flame retardancy according to the UL94 standards, so that the laminate and circuit board which applies the low electric resin composition have good flame retardancy. Moreover, as compared to the application of other flame retardants, the vinylbenzyl-etherified-DOPO compound resin can also provide better dielectric properties to the laminates and circuit boards.

DETAILED DESCRIPTION OF THE SPECIFIC EMBODIMENTS

The present invention will be further described below in detail in combination with the examples and the accompanying drawings, but the embodiments of the present invention are not limited thereto.

The chemical names used in the following examples are as follows:

DOPO-HQ resin: 10-(2,5-dihydroxyphenyl)-10-hydrogen-9-oxa-10-phosphaphenanthrene-10-oxide, purchased from Nu tech Fine Chemical.

DOPO-HQ epoxy resin: 10-(2,5-dihydroxyphenyl)-10-hydrogen-9-oxa-10-phosphaphenanthrene-10-oxide-ortho-methyl phenolic epoxy resin, purchased from ChangChun Plastics Co., Ltd.

SA-9000: bisphenol A polyphenylene ether resin terminated with methyl polyacrylate, purchased from Sabic Company.

SA-90: bisphenol A polyphenylene ether resin with bifunctional terminal hydroxyl, purchased from Sabic Company.

OPE-2st: biphenyl polyphenylene ether resin terminated with vinyl benzyl ether, purchased from Mitsubishi Gas Chemical Company.

Ricon184Ma6: maleinized styrene-butadiene copolymer, purchased from Cray Valley Company.

Ricon257: styrene-butadiene-divinylbenzene copolymer, purchased from Cray Valley Company.

TAIC: triallyl isocyanurate, purchased from Cray Valley Company.

BA-230S: bisphenol A cyanate resin, purchased from Lonza Company.

BTP-6020S: cyanate resin, purchased from Lonza Company.

BMI-2300: phenyl methane maleimide, purchased from Daiwa Kasei Company.

BMI-70: bis(3-ethyl-5-methyl-4-maleimidophenyl)methane, purchased from KI Chemistry.

25B: 2,5-dimethyl-2,5-di(tert-butyl peroxy)-3-hexyne, purchased from NOF Corporation.

SPB-100: phosphazene compound, purchased from Otsuka Chemical Company.

Saytex 8010: ethane-1,2-bis(pentabromobenzene), purchased from Albemarle Company.

Saytex BT-93W: ethyl-bis(tetrabromophenyl-ortho-dicarboximide), purchased from Albemarle Company.

PX-202: resorcinol bisxylylphosphate, purchased from Daihachi Chemistry Company, Japan.

Fused silica: fused silica, purchased from Sibelco Company.

EXAMPLE 1

Preparation of Vinylbenzyl-etherified-DOPO Compound Resin Composition (1) Preparation of Vinylbenzyl-etherified-DOPO Compound Resin ① Preparation of Vinylbenzyl-etherified-DOPO-HQ Resin 0.5 mol DOPO-HQ resin (purchased from XinDa Fine Chemical, the structure shown as formula XVI) and 1.1 mol sodium hydroxide were added into a four-neck reaction flask containing toluene, heated to 50° C., reacted for 30 min under stirring, then added 1.15 mol 4-chloromethylstyrene and 0.075 mol tetrabutyl ammonium bromide, reacted for 6 h under stirring, after the reaction was completed, the system was cooled to ambient temperature, filtrated, washed, thus obtaining a product. An infrared analysis was carried out on the prepared vinylbenzyl-etherified-DOPO-HQ resin and the unreacted DOPO-HQ resin, and a thermogravimetric analysis was carried out on the vinylbenzyl-etherified-DOPO-HQ resin, the results were shown in FIGS. 1~3, and the peak analysis were shown in tables 7~8.

Figure 1:
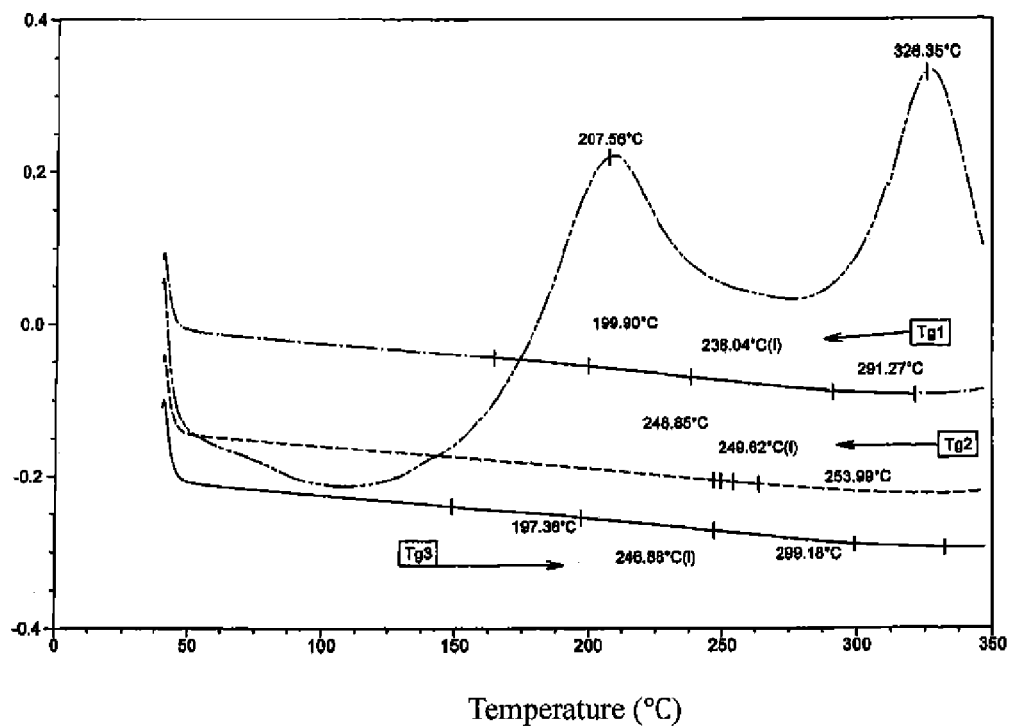
FIG. 1 is a Thermogravimetric Analysis diagram of the vinylbenzyl-etherified-DOPO-HQ resin prepared in example 1.
Figure 2:
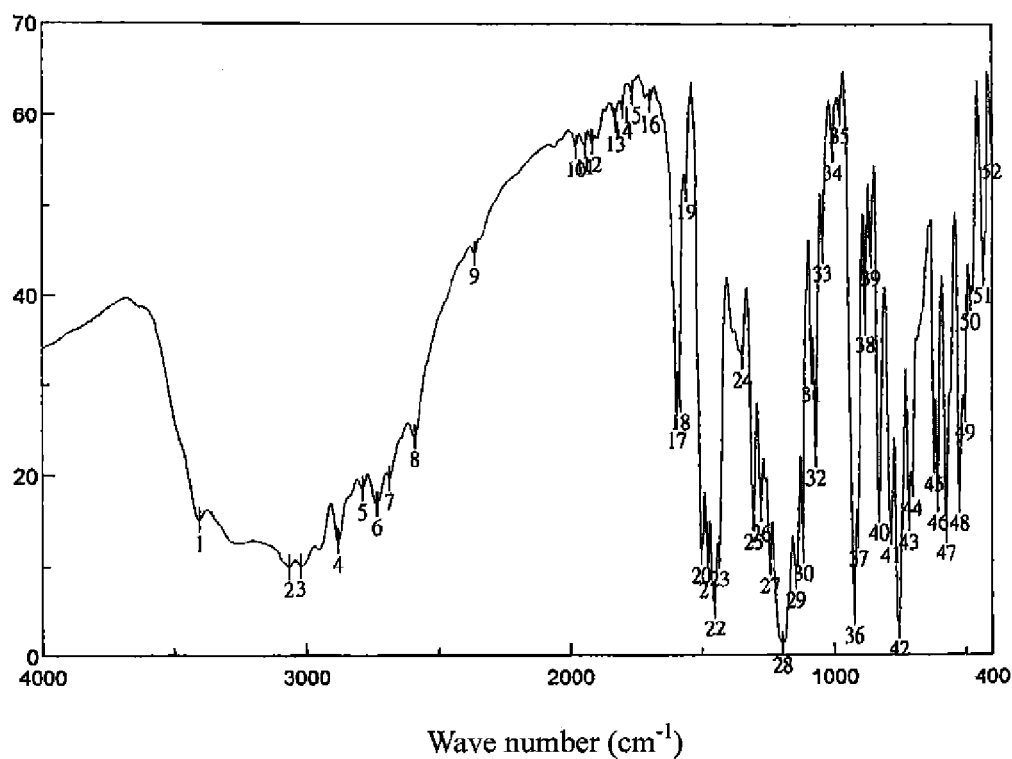
FIG. 2 is a FTIR spectrogram of the DOPO-HQ resin.
Figure 3:
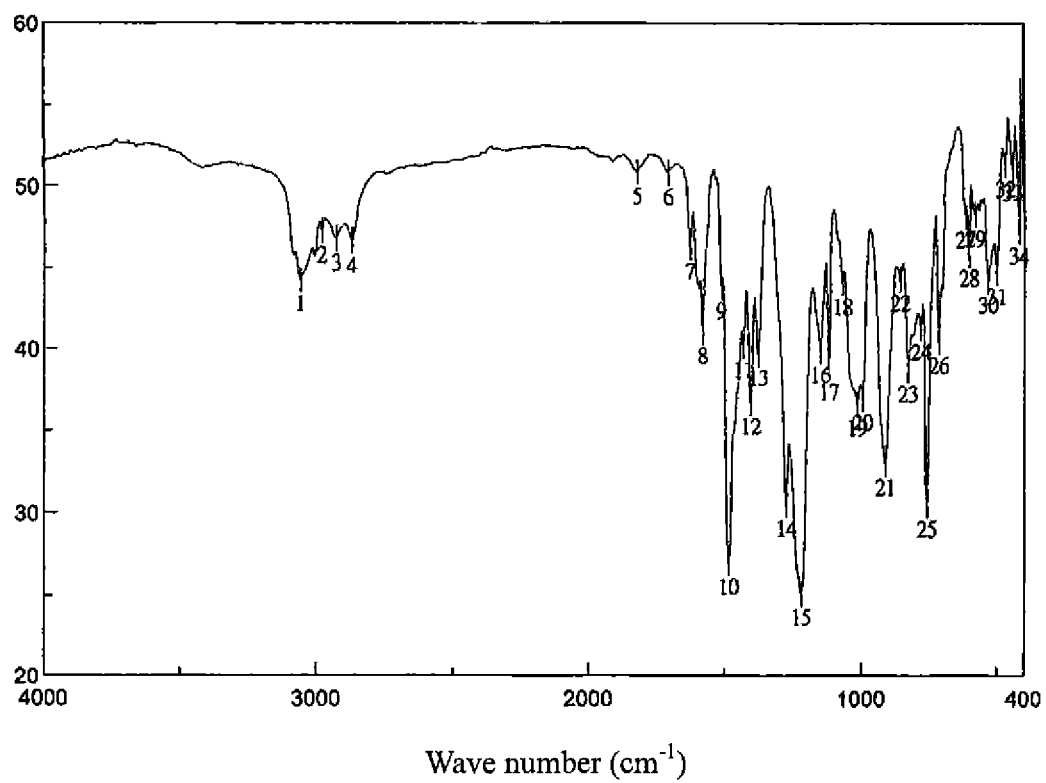
FIG. 3 is a FTIR spectrogram of vinylbenzyl-etherified-DOPO-HQ resin prepared in example 1.

FIG. 1 was the thermogravimetric analysis result of the vinylbenzyl-etherified-DOPO-HQ resin, in which the ΔH and Tg values were shown. In FIG. 2, the absorption peak for the hydroxyl of the DOPO-HQ resin is at 3000~3400 $cm^{-1}$, and in FIG. 3, the absorption peak for the hydroxyl of the vinylbenzyl-etherified-DOPO-HQ resin was significantly decreased, and the absorption peak for the vinyl functional group (C=C) occurred at 1620~1630 $cm^{-1}$, which demonstrated that it was successfully vinylbenzylated.

② Preparation of Vinylbenzyl-etherified-DOPO-NQ Resin

The synthesis of DOPO-NQ (the structure shown as formula XVII) was carried out as follows: 1 mol (216 g) DOPO (purchased from Nu tech Fine Chemical) and 500 mL toluene were added into a glass reaction kettle equipped with mechanical stirrer, condenser tube, thermometer, and nitrogen gas protection, heated to 70° C. under stirring, added 0.9 mol (142 g) 1,4-naphthoquinone (purchased from J&K Scientific Ltd.) over 1.5 h, reacted under stirring for 2 h at 90° C., cooled to ambient temperature, filtrated, washed many times with toluene, dried for 10 h, then obtained white powder, recrystallized with ethanol, and dried, thus obtaining white DOPO-NQ, with a yield of 89%.

0.5 mol DOPO-NQ and 1.5 mol potassium hydroxide were added into a four-neck reaction flask containing toluene, heated to 70° C., reacted for 30 min under stirring, then added 1.5 mol 4-chloromethylstyrene and 0.1 mol tetrabutyl ammonium bromide, reacted for 10 h under stirring, after the reaction was completed, the system was cooled to ambient temperature, filtrated, washed, thus obtaining a product.

③ Preparation of Vinylbenzyl-etherified-DOPO-BPAN Resin 0.5 mol DOPO-BPAN (XZ92741, purchased from Dow Chemical Company, the structure shown as formula XXIII) and 2.5 mol sodium hydroxide were added into a four-neck reaction flask containing toluene solvent, heated to 55° C., reacted for 30 min under stirring, then added 2.4 mol 4-chloromethylstyrene and 0.16 mol tetrabutyl ammonium bromide into the system, reacted for 7 h under stirring, after the reaction was completed, the system was cooled to ambient temperature, filtrated, and washed, thus obtaining a product.

(2) Preparation of Vinylbenzyl-etherified-DOPO Compound Resin Composition

The related components were sufficiently mixed according to the formulation listed in tables 1~2, thus obtaining a vinylbenzyl-etherified-DOPO compound resin composition.

(3) Preparation of the Comparative Examples

The related components were sufficiently mixed according to the formulation listed in table 3, thus obtaining a comparative resin composition.

TABLE 1 vinylbenzyl-etherified-DOPO compound resin composition formulation list (unit: parts by weight)

| Components | | E1 | E2 | E3 | E4 | E5 | E6 | E7 |
|---|---|---|---|---|---|---|---|---|
| Vinylbenzyl-etherified-DOPO-HQ resin | | 50 | 10 | 80 | 100 | 50 | 20 | 30 |
| Vinyl-terminated polyphenylene ether resin | OPE-2st | 100 | 100 | 100 | 100 | 50 | — | — |
| | SA-9000 | — | — | — | — | 50 | — | — |
| Cyanate resin | BA-230S | — | — | — | — | — | 100 | — |
| | BTP-6020S | — | — | — | — | — | — | 100 |
| Maleimide resin | BMT-2300 | — | — | — | — | — | — | 50 |
| Inorganic filler | Fused silicon dioxide | 100 | 100 | 100 | 100 | 100 | 100 | 100 |

TABLE 1-continued vinylbenzyl-etherified-DOPO compound resin composition
formulation list (unit: parts by weight)

| Components | | E1 | E2 | E3 | E4 | E5 | E6 | E7 |
|---|---|---|---|---|---|---|---|---|
| Solvent | toluene | 150 | 150 | 150 | 150 | 150 | 150 | 150 |
| Hardening accelerator | 25B | 2.5 | 2.5 | 2.5 | 2.5 | 2.5 | 2.5 | 2.5 |

TABLE 2 vinylbenzyl-etherified-DOPO compound resin composition
formulation list (unit: parts by weight)

| Components | | E8 | E9 | E10 | E11 | E12 | E13 | E14 |
|---|---|---|---|---|---|---|---|---|
| Vinylbenzyl-etherified-DOPO-HQ resin | | 40 | 50 | 50 | 50 | 50 | 50 | 50 |
| Vinyl-terminated polyphenylene ether resin | OPE-2st | — | 100 | 50 | 70 | 100 | 50 | 50 |
| | SA-9000 | — | — | — | — | — | — | 50 |
| Styrene-butadiene copolymer | Ricon257 | 40 | — | — | — | 20 | 20 | 25 |
| | Ricon184Ma6 | — | 30 | — | — | 5 | 10 | 5 |
| Cyanate resin | BA-230S | — | — | 25 | — | 15 | 15 | 15 |
| | BTP-60205 | 100 | — | 25 | 30 | — | 15 | 15 |
| Maleimide resin | BMI-2300 | — | — | — | — | 25 | 10 | 10 |
| | BMI-70 | — | — | — | 30 | — | 20 | 20 |
| Triallylisocyanurate | TAIC | — | 30 | 30 | — | — | — | — |
| Flame retardant | SPB-100 | — | — | — | — | 10 | 5 | — |
| | PX-202 | — | — | — | — | — | 5 | — |
| | Saytex 8010 | — | — | — | — | — | — | 20 |
| | Saytex BT-93w | — | — | — | — | — | — | 10 |
| Inorganic filler | Fused silica | 100 | 100 | 100 | 100 | 100 | 100 | 100 |
| Solvent | toluene | 150 | 300 | 300 | 300 | 300 | 300 | 300 |
| Hardening accelerator | 25B | 2.5 | 2.5 | 2.5 | 2.5 | 2.5 | 2.5 | 2.5 |

TABLE 3 resin formulation list in the comparative examples (units: parts by weight)

| Components | | C1 | C2 | C3 | C4 | C5 | C6 | C7 | C8 |
|---|---|---|---|---|---|---|---|---|---|
| DOPO-HQ resin | DOPO-HQ | 50 | — | — | — | 50 | — | 25 | — |
| DOPO-HQ epoxy resin | DOPO-HQ-CNE | — | 80 | — | — | — | 50 | 25 | 100 |
| Polyphenylene ether resin | OPE-2st | 100 | 100 | 100 | 100 | — | 70 | 70 | 70 |
| | SA-90 | — | — | — | — | — | — | 30 | — |
| | SA-9000 | — | — | — | — | — | 30 | — | — |
| Cyanate resin | BA-230S | — | — | — | — | — | 15 | 30 | 30 |
| | BTP-6020S | — | — | — | — | 100 | — | — | — |
| Maleimide resin | BMI-2300 | — | — | — | — | 50 | 30 | 30 | 30 |
| | BMI-70 | — | — | — | — | — | — | — | — |
| Flame retardant | SPB-100 | — | — | 50 | — | — | — | — | 10 |
| | PX-202 | — | — | — | 50 | — | — | — | 10 |
| Inorganic filler | Fused silica | 100 | 100 | 100 | 100 | 100 | 100 | 100 | 100 |
| Solvent | toluene | 150 | 150 | 150 | 150 | 150 | 300 | 300 | 300 |
| Hardening accelerator | 25B | 2.5 | 2.5 | 2.5 | 2.5 | 2.5 | 2.5 | 2.5 | 2.5 |

The resulting resin compositions prepared in the above-mentioned examples E1~14 and comparative examples C1~8 were placed into impregnation tanks respectively, then the glass fiber cloths (2116 glass fiber cloth, purchased from Nanya Plastics Industry) were passed through the above impregnation tanks to make the resin compositions adhere to the glass fiber cloths, then heated and baked into semi-cured state, thus obtaining prepregs; four prepregs taken from each of the prepregs prepared above respectively, and two 18 μm copper foils were superimposed in the order of copper foil, four prepreg, and copper foil, then a copper clad laminate was formed by compressing for 2 hours at 200° C. in vacuum, wherein the four prepregs were cured and formed an insulated layer between the two copper foils.

The physical properties of the above copper clad laminate and no copper-containing laminate obtained after the copper foils were etched were measured respectively, wherein the measurement items for the physical properties comprised glass transition temperature (Tg, measured by DMA instrument (Dynamic Mechanical Analysis)), heat resistance (T288, measured by TMA thermomechanical analyzer, wherein the copper clad laminate was measured for the time that the plate did not burst during heating at 288° C.), thermal expansion coefficient (CTE z-axis, α1:50~120° C., measured by TMA instrument (thermomechanical analyzer), unit ppm/° C., the lower CTE value was better), immersion tin test of the copper clad laminate (solder dip, S/D, 288° C., 10 sec, wherein the heat resistant times was measured), immersion tin test after the no copper-containing laminate PCT (Pressure Cook Test) and moisture absorption (cooked under a high pressure at 121° C., after 3 hours, carried out immersion tin test at 288° C., after 20 s, observed for the presence of burst plate), the tensile force between the copper foil and the laminate (peel strength, measured by an universal tensile testing machine), P/S, the higher tensile force between the copper foil and the laminate was the better, dielectric constant (Dk, the lower Dk value was better, wherein the Dk value of the no copper-containing laminate was measured by AET microwave dielectric analyzer, 10 GHz), dielectric loss tangent (Df, the lower Df value was better, wherein the Df value of the no copper-containing laminate was measured by AET microwave dielectric analyzer, 10 GHz), and flame resistance (burning test, UL94, wherein in the grade array, V-0 was better than V-1).

Among them, the physical properties measurement results of the resin composition laminates in examples E1~14 were listed in table 4~5; and the physical properties measurement results of the rein composition laminates in the comparative examples C1~8 were listed in table 6.

TABLE 4 the performance index of the vinylbenzyl-etherified-DOPO compound resin composition laminate

| Property test | Test method | E1 | E2 | E3 | E4 | E5 | E6 | E7 |
|---|---|---|---|---|---|---|---|---|
| Tg | Thermomechanical analyzer/° C. | 210 | 202 | 215 | 218 | 212 | 223 | 221 |
| T288 | Thermodynamic analyzer/min | >30 | >30 | >30 | >30 | >30 | >30 | >30 |
| S/D | immersion tin test, 288° C., 10 sec, measured the heat resistant times | >20 | >20 | >20 | >20 | >20 | >20 | >20 |
| PCT | Cooked under a high pressure at 121° C., after 3 hr, carried out immersion tin test, at 288° C., after 20 sec, observed for the presence of burst | passed | passed | passed | passed | passed | passed | passed |
| Dk | 10 GHz, AET microwave dielectric analyzer | 3.95 | 3.78 | 3.98 | 4.01 | 3.95 | 3.86 | 3.86 |
| Df | 10 GHz, AET microwave dielectric analyzer | 0.0066 | 0.0061 | 0.0072 | 0.00899 | 0.0070 | 0.0091 | 0.0092 |
| Flame retardancy | Burning test UL94 | V-0 | V-1 | V-0 | V-0 | V-0 | V-1 | V-0 |

TABLE 5 the performance index of the vinylbenzyl-etherified-DOPO compound resin composition laminate

| Property test | Test method | E8 | E9 | E10 | E11 | E12 | E13 | E14 |
|---|---|---|---|---|---|---|---|---|
| Tg | Thermomechanical analyzer/° C. | 206 | 198 | 203 | 200 | 206 | 205 | 200 |
| T288 | Thermodynamic analyzer/min | >30 | >30 | >30 | >30 | >60 | >60 | >60 |
| S/D | Immersion tin test, 288° C., 10 sec, measured heat resistant times | >20 | >20 | >20 | >20 | >20 | >20 | >20 |
| PCT | Cooked under a high pressure at 121° C., after 3 hr, carried out immersion tin test, 288° C., after 20 sec, observed for the presence of burst | passed | passed | passed | passed | passed | passed | passed |
| Dk | 10 GHz, AET microwave dielectric analyzer | 3.81 | 3.81 | 3.79 | 3.78 | 3.79 | 3.79 | 3.78 |
| Df | 10 GHz, AET microwave dielectric analyzer | 0.0072 | 0.0063 | 0.0063 | 0.0062 | 0.0058 | 0.0059 | 0.0059 |
| Flame retardance | Burning test UL94 | V-0 | V-0 | V-0 | V-0 | V-0 | V-0 | V-0 |

TABLE 6 the performance index of the resin laminate in the comparative examples

| Property test | Test method | C1 | C2 | C3 | C4 | C5 | C6 | C7 | C8 |
|---|---|---|---|---|---|---|---|---|---|
| Tg | Thermomechanical analyzer/° C. | 185 | 191 | 188 | 175 | 188 | 198 | 192 | 193 |
| T288 | Thermodynamic analyzer/min | 2 | 13 | >30 | >30 | 8 | 15 | 25 | 30 |
| S/D | Immersion tin test, 288° C., 10 second, measured the heat resistant times | 5 | 10 | >20 | >20 | 8 | 15 | 15 | 15 |
| PCT | Cooked under a high pressure at 121° C., after 3 hr, carried out immersion tin test, 288° C., after 20 sec, observed the presence of burst | delamination | delamination | passed | passed | delamination | passed | delamination | passed |
| Dk | 10 GHz, AET microwave dielectric analyzer | 4.15 | 4.12 | 3.85 | 3.75 | 4.05 | 4.05 | 4.07 | 4.11 |
| Df | 10 GHz, AET microwave dielectric analyzer | 0.0167 | 0.0147 | 0.0061 | 0.0052 | 0.0157 | 0.0141 | 0.0145 | 0.0147 |
| Flame retardance | Burning test UL94 | V-0 | V-0 | V-1 | V-2 | V-0 | V-0 | V-0 | V-0 |

From tables 3 and 4, after synthetically comparing the examples 1~14 with the comparative examples 1~8, it can be found that the vinylbenzyl-etherified-DOPO compound resin composition of the present invention, by virtue of containing specific components and proportion, can achieve various circuit board properties, such as high glass transition temperature, low dielectric properties, good heat resistance, good flame retardancy, etc.

From examples 1~7, it can be found that when the usage amount of the vinylbenzyl-etherified-DOPO compound resin reached 30 parts by weight, UL94 V-0 flame retardancy can be obtained.

From examples 1~3, it can be found that when the vinylbenzyl-etherified-DOPO-HQ resin and vinyl-terminated polyphenylene ether resin in example 1 were combined, good electric properties and flame retardancy can be achieved, when the content of the vinylbenzyl-etherified-DOPO compound resin in example 2 was decreased, the flame retardancy was decreased (only V-1), when the content of the vinylbenzyl-etherified-DOPO compound resin in example 3 was excessive, the dielectric properties (DK and Df) were deteriorated, because the excessive vinylbenzyl-etherified-DOPO compound resin resulted in the increase of phosphorus content, thus resulting in the increase of the dielectric properties.

From examples 6~7, it can be found that the vinylbenzyl-etherified-DOPO compound resin can also be combined with cyanate resin or maleimide resin to carry out bond reaction, thus manufacturing a laminate with high Tg.

From examples 8~9, it can be seen that the addition of styrene-butadiene copolymer can further decrease the dielectric loss tangent of the laminate, thus obtaining better dielectric properties, the increase usage of styrene-butadiene in example 8 can make the cyanate resin system achieve better dielectric properties (lower was better), the increase usage of styrene-butadiene in example 9 can make the vinyl-terminated polyphenylene ether resin system achieve better dielectric properties (lower was better).

From examples 10 and 11, it can be found that the vinylbenzyl-etherified-DOPO compound resin can also be combined with the mixture system of cyanate resin and the vinyl-terminated polyphenylene ether resin, thus having good dielectric properties and flame retardancy.

Examples 12~13 were the preferable examples of resin composition system, which can achieve good dielectric properties of the laminate, wherein examples 12 and 13 can be combined with other phosphorus-based flame retardant, and from example 14, it can be seen that the resin composition system of the present invention can also be used mixedly by combining with the bromine-based flame retardants.

As compared the example 1 with the comparative example 1, it can be found that the difference between the laminate manufactured by using the combination of the vinylbenzyl-etherified-DOPO compound resin and the vinyl-terminated polyphenylene ether resin in example 1 and the laminate manufactured by using the combination of the hydroxyl-containing DOPO-HQ resin and the vinyl-terminated polyphenylene ether resin in comparative example 1 was that the use of the hydroxyl-containing DOPO-HQ resin can significantly deteriorate the dielectric properties of the laminate and the heat resistance of the laminate. On the contrary, the vinylbenzyl ether functional group-containing vinylbenzyl-etherified-DOPO compound resin can react with ethylene or styrene-containing polyphenylene ether resin (such as OPE-2st, vinyl-terminated polyphenylene ether resin), ie., cross-linking bond reaction, thus increasing the heat resistance of the laminate, and having good dielectric properties of the laminate.

As compared example 1 with the comparative example 2, it can be found that the heat resistance of the laminate manufactured by the combination of the DOPO-HQ epoxy resin and the vinyl-terminated polyphenylene ether resin was increased slightly, but as compared with the resin combination in example 1, the heat resistance and the dielectric properties of the laminate in example 2 were still obviously poor.

As compared example 3 with comparative example 4, it was shown that when the vinyl-terminated polyphenylene ether resin was used by only combining with the phosphorus-based flame retardants which generally had no reactivity, it was difficult to achieve the UL94 V-0 flame retardant effect. These results demonstrated that all of the resins containing DOPO-HQ structure had flame retardancy, in other words, these results also demonstrated that the vinylbenzyl-etherified-DOPO compound resins had flame retardancy.

As compared examples 10~14 with comparative examples 5~7, it was shown that the laminate manufactured by the vinyl-terminated polyphenylene ether resin and/or the cyanate system in combination with DOPO-HQ resin or DOPO-HQ epoxy resin containing hydroxyl had significantly poor heat resistance and dielectric properties, from comparative example 8, it was shown that the laminate manufactured by further combining with the phosphorus-based flame retardants which generally had no reactivity still had poor heat resistance and dielectric properties.

As described above, the vinylbenzyl-etherified-DOPO compound resin composition in the present invention, by virtue of containing specific components and proportion, can achieve low thermal expansion coefficient, low dielectric constant, low dielectric loss tangent, high heat resistance and high flame retardancy; the performance parameters of the prepreg or resin film manufactured therefrom can meet the purpose for applying to copper foil laminate sand printed circuit boards; with respect to the industry availability, the products derived from the present invention can sufficiently satisfy the present market requirements.

TABLE 7 the infrared spectra peak analysis of the unreacted DOPO-HQ resin

| No. | Peak | Strength | No. | Peak | Strength |
|---|---|---|---|---|---|
| 1 | 3403.74 | 15.1340 | 2 | 3066.26 | 10.0223 |
| 3 | 3019.98 | 10.1057 | 4 | 2881.13 | 12.8168 |
| 5 | 2786.63 | 18.5738 | 6 | 2732.64 | 16.9154 |
| 7 | 2686.43 | 19.6755 | 8 | 2589.93 | 24.3019 |
| 9 | 2362.37 | 44.7223 | 10 | 1978.61 | 56.5419 |
| 11 | 1943.89 | 56.8248 | 12 | 1916.9 | 57.1516 |
| 13 | 1828.19 | 59.4111 | 14 | 1799.26 | 60.9664 |
| 15 | 1764.55 | 62.5236 | 16 | 1695.12 | 64.5844 |
| 17 | 1594.84 | 26.4257 | 18 | 1581.34 | 28.4133 |
| 19 | 1558.2 | 51.9278 | 20 | 1502.28 | 11.6053 |
| 21 | 1475.28 | 9.9499 | 22 | 1450.21 | 5.5966 |
| 23 | 1432.85 | 11.1352 | 24 | 1346.07 | 33.1421 |
| 25 | 1303.65 | 15.2762 | 26 | 1276.65 | 16.1900 |
| 27 | 1251.93 | 10.4164 | 28 | 1195.65 | 1.4143 |
| 29 | 1145.51 | 8.8390 | 30 | 1116.58 | 11.7505 |
| 31 | 1083.8 | 31.5687 | 32 | 1068.39 | 22.2765 |
| 33 | 1043.3 | 44.9954 | 34 | 1006.66 | 56.2586 |
| 35 | 977.733 | 60.4709 | 36 | 925.664 | 4.7117 |
| 37 | 908.308 | 13.4054 | 38 | 881.309 | 37.0846 |
| 39 | 860.096 | 44.4407 | 40 | 829.241 | 16.4997 |
| 41 | 784.886 | 13.7277 | 42 | 752.102 | 3.1984 |
| 43 | 715.461 | 15.1915 | 44 | 701.962 | 18.9504 |
| 45 | 619.038 | 21.5223 | 46 | 605.539 | 17.3798 |
| 47 | 574.683 | 14.0505 | 48 | 522.615 | 17.3129 |
| 49 | 501.401 | 27.3629 | 50 | 482.117 | 39.6664 |
| 51 | 433.905 | 43.5671 | 52 | 401.121 | 56.5141 |

TABLE 8 the infrared spectra peak analysis of the vinylbenzyl-etherified-DOPO-HQ resin

| No. | Peak | Strength | No. | Peak | Strength |
|---|---|---|---|---|---|
| 1 | 3058.55 | 44.2662 | 2 | 2979.46 | 47.2676 |
| 3 | 2927.41 | 46.7976 | 4 | 2871.49 | 46.6609 |
| 5 | 1820.47 | 50.8988 | 6 | 1706.69 | 50.8335 |
| 7 | 1627.63 | 46.3558 | 8 | 1581.34 | 41.1299 |
| 9 | 1511.92 | 43.9100 | 10 | 1484.92 | 27.0010 |
| 11 | 1430.92 | 40.2662 | 12 | 1403.92 | 36.7895 |
| 13 | 1374.93 | 39.7657 | 14 | 1272.79 | 30.5362 |
| 15 | 1216.86 | 25.1253 | 16 | 1146.37 | 39.9587 |
| 17 | 1118.51 | 38.9363 | 18 | 1068.37 | 44.1540 |
| 19 | 1014.37 | 36.7046 | 20 | 993.16 | 37.0544 |
| 21 | 910.236 | 33.0810 | 22 | 856.239 | 44.3928 |
| 23 | 827.312 | 38.8109 | 24 | 781.029 | 41.4026 |
| 25 | 755.959 | 30.5100 | 26 | 713.533 | 40.5346 |
| 27 | 617.109 | 48.2594 | 28 | 603.61 | 45.9328 |
| 29 | 582.397 | 48.3411 | 30 | 534.185 | 44.3038 |
| 31 | 501.401 | 44.8066 | 32 | 468.617 | 51.3078 |
| 33 | 441.619 | 51.1118 | 34 | 420.406 | 47.3186 |

The above examples are the preferred embodiments of the present invention, but the embodiments of the present invention are not limited thereto, any other changes, modifications, substitutions, combinations, and simplification, which are all the equivalent replacement modes, are all included in the protection range of the present invention, without deviating from the spiritual essences and principles of the present invention.

What is claimed is:

1. A vinylbenzyl-etherified-DOPO compound resin composition, comprising the components of:

(A) vinylbenzyl-etherified-DOPO compound resin; and (B) vinyl-terminated polyphenylene ether resin.

2. The vinylbenzyl-etherified-DOPO compound resin composition according to claim 1, wherein the vinylbenzyl-etherified-DOPO compound resin composition comprises 10~500 parts by weight of the vinylbenzyl-etherified-DOPO compound resin and 100 parts by weight of the vinyl-terminated polyphenylene ether resin.

3. The vinylbenzyl-etherified-DOPO compound resin composition according to claim 1, wherein the vinylbenzyl-etherified-DOPO compound resin composition comprises 30~80 parts by weight of the vinylbenzyl-etherified-DOPO compound resin and 100 parts by weight of the vinyl-terminated polyphenylene ether resin.

4. The vinylbenzyl-etherified-DOPO compound resin composition according to claim 1, wherein the vinylbenzyl-etherified-DOPO compound resin is any compound having a structure of formula (I) to formula (III), and at least one of the modified resins and modified materials having such structure:

Formula (I)
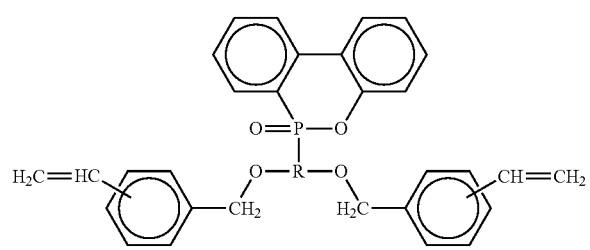
Formula (II)
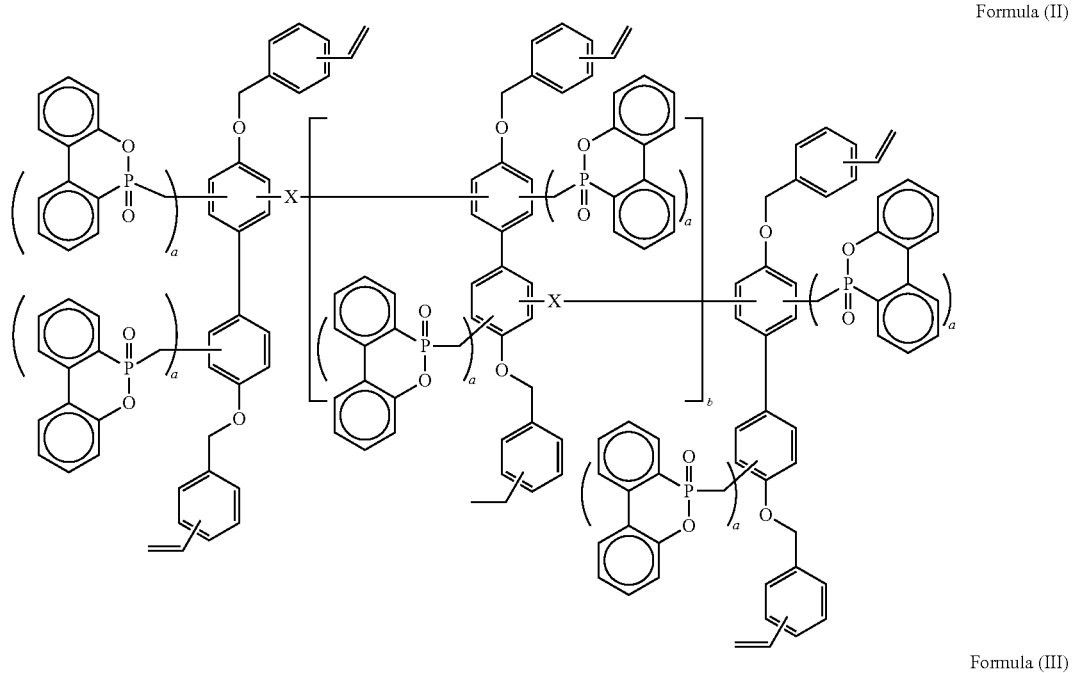
Formula (III)
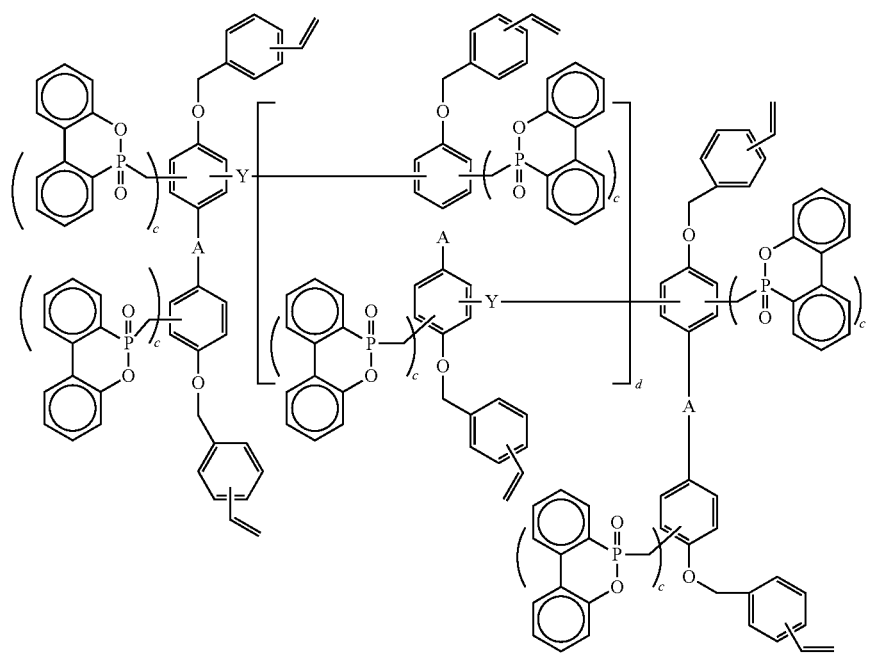
wherein, R is  or 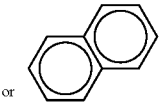 ;

X, Y are —CH₂— or —CH₂—O—CH₂—, respectively;

A represents C1~20 linear, branched, or circular alkyl;

a is any natural number of 0~4, and at least one of a is not 0;

c is any natural number of 0~4, and at least one of c is not 0;

b, d are natural number of 0~6;

the vinyl-terminated polyphenylene ether resin refers to a polyphenylene ether resin wherein the end capping group has an unsaturated double bond.

5. The vinylbenzyl-etherified-DOPO compound resin composition according to claim 1, wherein the vinylbenzyl-etherified-DOPO compound resin refers to a vinylbenzyl-etherified-DOPO compound resin having any structure of formula (II) and formula (IV)~(XII):

Formula (II)

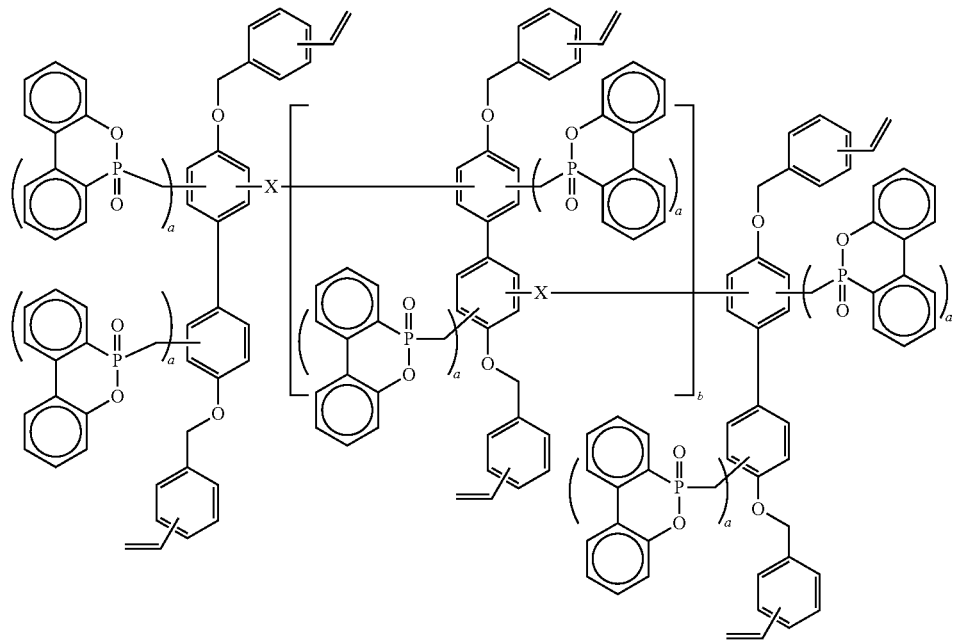

Formula (IV)

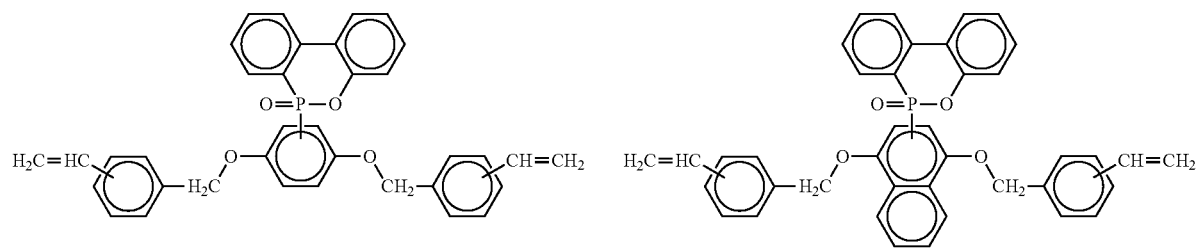

Formula (V)

Formula (VI)

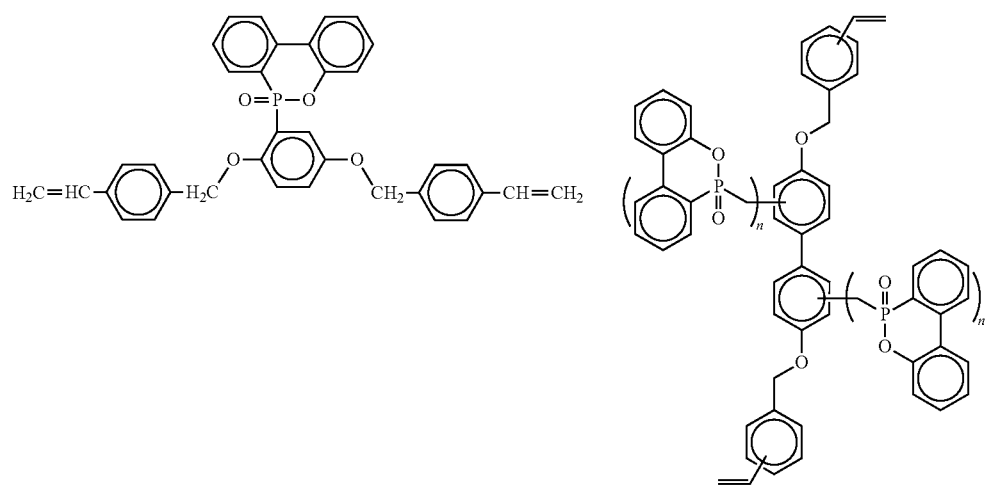

Formula (VII)

Formula (VIII)
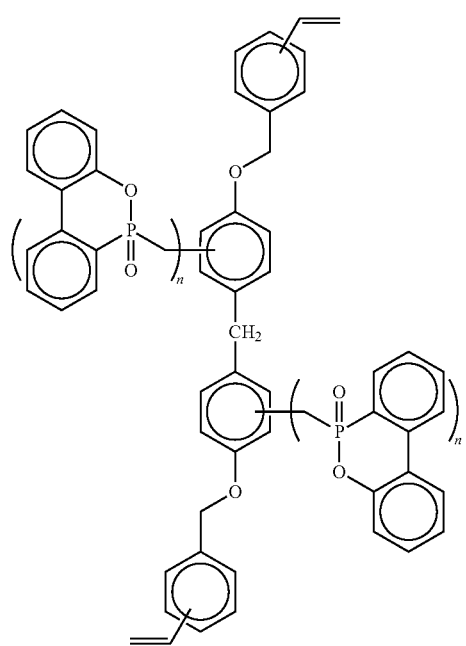
Formula (IX)
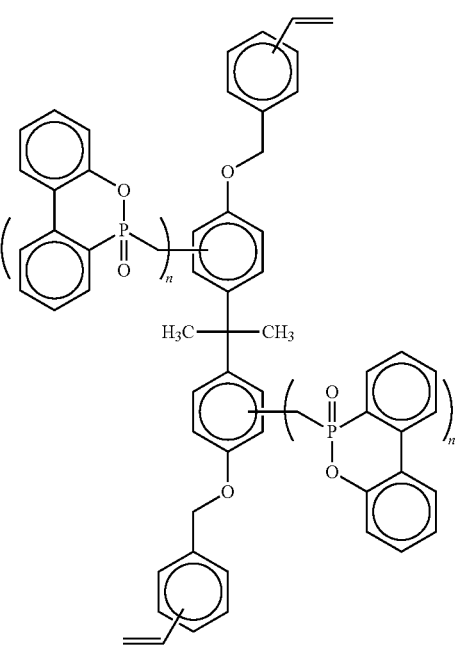
Formula (X)
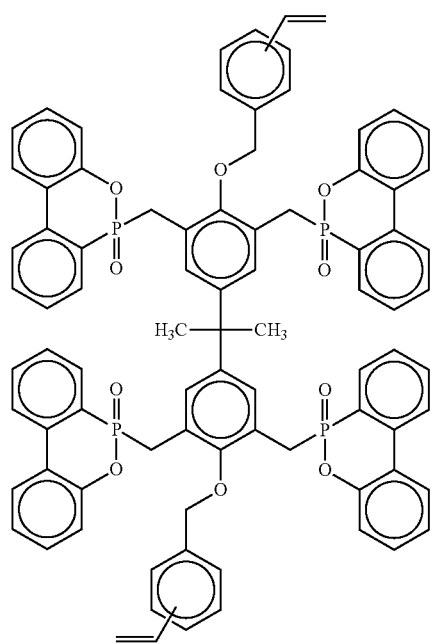

-continued

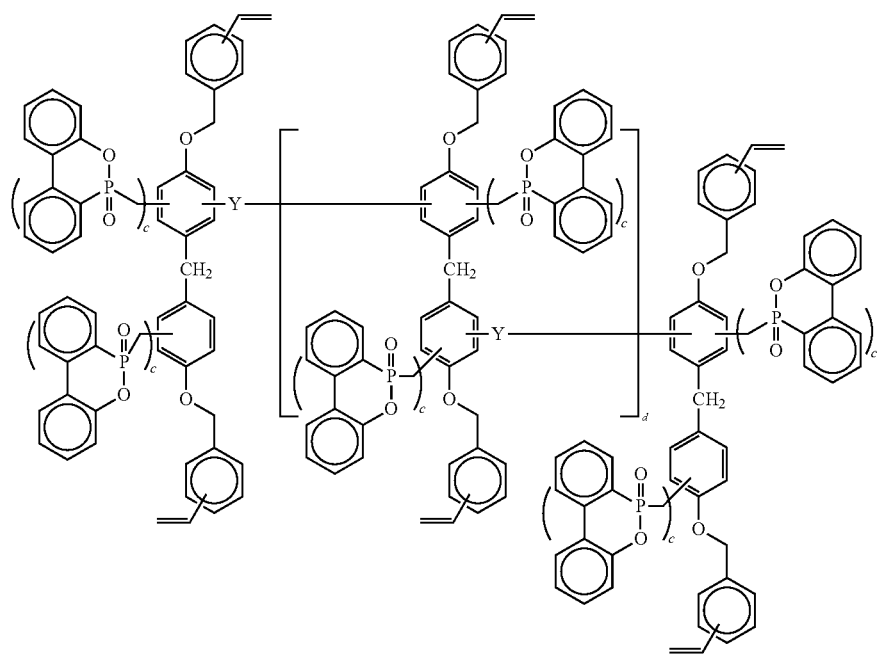

Formula (XI)

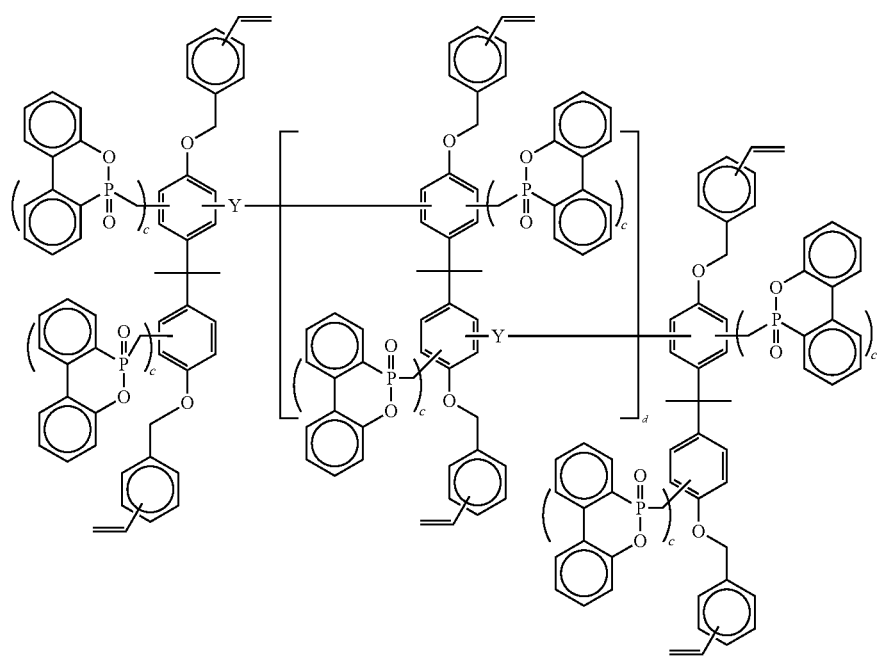

Formula (XII)

X, Y are —CH$_2$— or —CH$_2$—O—CH$_2$—, respectively;
n is any natural number of 1~4;
a is any natural number of 0~4, and at least one of a is not 0;
c is any natural number of 0~4, and at least one of c is not 0;
b, d are any natural number of 0~6.

6. The vinylbenzyl-etherified-DOPO compound resin composition according to claim 1, wherein the vinyl-terminated polyphenylene ether resin refers to a polyphenylene ether resin having one of the structures of formula (XXIV) and (XXV):

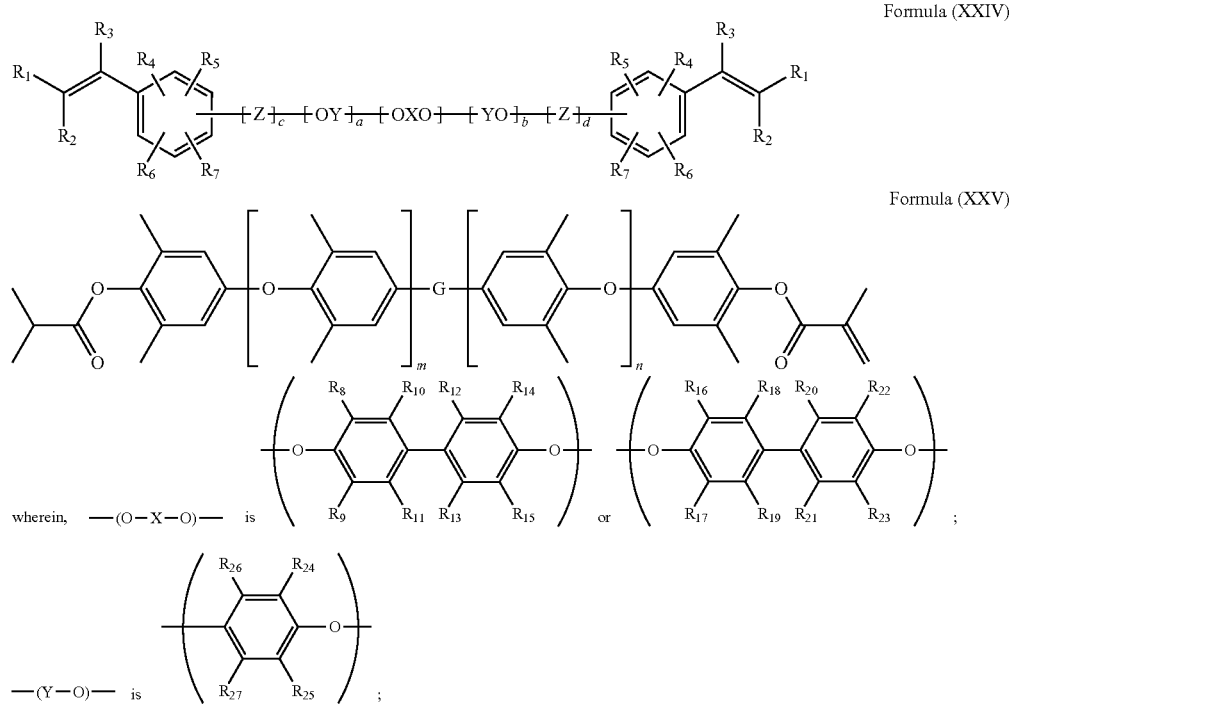

Formula (XXIV)

Formula (XXV)

$R_1$, $R_2$ are hydrogen atom, $R_3$, $R_4$, $R_5$, $R_6$ and $R_7$ are the same or different, and are hydrogen atom, halogen atom, alkyl group, or halo-substituted alkyl group;

$R_8$, $R_9$, $R_{10}$, $R_{13}$, $R_{14}$ and $R_{15}$ are the same or different, and are halogen atom, C1~6 alkyl group or phenyl; $R_{11}$ and $R_{12}$ are the same or different, and are hydrogen atom, halogen atom, C1~6 alkyl group or phenyl;

$R_{16}$, $R_{17}$, $R_{18}$, $R_{19}$, $R_{20}$, $R_{21}$, $R_{22}$ and $R_{23}$ are the same or different, and are halogen atom, C1~6 alkyl group, phenyl, or hydrogen atom; A is a C1~20 linear, branched, or circular alkyl;

$R_{24}$ and $R_{25}$ are the same or different, and are halogen atom, C1~6 alkyl group or phenyl; $R_{26}$ and $R_{27}$ are the same or different, and are hydrogen atom, halogen atom, C1~6 alkyl group, or phenyl;

Z represents an organic group having at least one carbon atom, which group can comprise oxygen atom, nitrogen atom, sulfur atom and/or halogen atom;

a and b are natural number of 1~30, respectively, c and d are 1;

G is bisphenol A, bisphenol F, or covalent bond; m and n are natural number of 1~15, respectively.

7. The vinylbenzyl-etherified-DOPO compound resin composition according to claim 1, wherein the vinyl-terminated polyphenylene ether resin refers to at least one of methacrylate polyphenylene ether resin and vinylbenzyl ether-terminated polyphenylene ether resin.

8. The vinylbenzyl-etherified-DOPO compound resin composition according to claim 1, wherein the vinylbenzyl-etherified-DOPO compound resin composition further comprises at least one of component (C) polymer, flame retardant, inorganic filler, hardening accelerator, interfacial active agent, silane coupling agent, toughening agent, and solvent.

9. The vinylbenzyl-etherified-DOPO compound resin composition according to claim 8, wherein the (C) polymer refers to at least one of styrene-butadiene copolymer, polybutadiene homopolymer, hydrogenated diene-butadiene-styrene copolymer, maleic anhydridized diene -butadiene-styrene copolymer, styrene-butadiene-styrene copolymer, styrene-isoprene-styrene copolymer, styrene-butadiene-divinylbenzene copolymer and maleinized styrene-butadiene copolymer.

10. The vinylbenzyl-etherified-DOPO compound resin composition according to claim 1 in manufacturing prepreg, resin film, laminated board and printed circuit board.

11. The vinylbenzyl-etherified-DOPO compound resin composition according to claim 2 in manufacturing prepreg, resin film, laminated board and printed circuit board.

12. The vinylbenzyl-etherified-DOPO compound resin composition according to claim 3 in manufacturing prepreg, resin film, laminated board and printed circuit board.

13. The vinylbenzyl-etherified-DOPO compound resin composition according to claim 4 in manufacturing prepreg, resin film, laminated board and printed circuit board.

14. The vinylbenzyl-etherified-DOPO compound resin composition according to claim 5 in manufacturing prepreg, resin film, laminated board and printed circuit board.

15. The vinylbenzyl-etherified-DOPO compound resin composition according to claim 6 in manufacturing prepreg, resin film, laminated board and printed circuit board.

16. The vinylbenzyl-etherified-DOPO compound resin composition according to claim 7 in manufacturing prepreg, resin film, laminated board and printed circuit board.

17. The vinylbenzyl-etherified-DOPO compound resin composition according to claim 8 in manufacturing prepreg, resin film, laminated board and printed circuit board.

18. The vinylbenzyl-etherified-DOPO compound resin composition according to claim 9 in manufacturing prepreg, resin film, laminated board and printed circuit board.

\* \* \* \* \*